US012623145B2

(12) United States Patent
    Fu

(10) Patent No.:    US 12,623,145 B2
(45) Date of Patent:       May 12, 2026

(54) IN-GAME INFORMATION PROCESSING METHOD AND APPARATUS, ELECTRONIC DEVICE, AND STORAGE MEDIUM

(71) Applicant: NETEASE (HANGZHOU) NETWORK CO., LTD., Hangzhou (CN)

(72) Inventor: Jingyi Fu, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 66 days.

(21) Appl. No.: 18/548,492

(22) PCT Filed: Jul. 26, 2022

(86) PCT No.: PCT/CN2022/107993
    § 371 (c)(1),
    (2) Date: Aug. 30, 2023

(87) PCT Pub. No.: WO2023/173649
    PCT Pub. Date: Sep. 21, 2023

(65)            Prior Publication Data
    US 2025/0010185 A1      Jan. 9, 2025

(30)        Foreign Application Priority Data
    Mar. 17, 2022    (CN) .......................... 202210265419.4

(51) Int. Cl.
    *A63F 13/52*        (2014.01)
    *G06F 9/451*        (2018.01)
(52) U.S. Cl.
    CPC .............. *A63F 13/52* (2014.09); *G06F 9/451* (2018.02)

(58) Field of Classification Search
    CPC ...... A63F 13/52; A63F 13/537; A63F 13/837; A63F 13/55; A63F 13/56; G06F 9/451
    (Continued)

(56)            References Cited

U.S. PATENT DOCUMENTS

2007/0075985 A1* 4/2007 Niida ................... A63F 13/533
                                                    345/173
2008/0119268 A1* 5/2008 Kando ................... A63F 13/00
                                                    463/31
                    (Continued)

FOREIGN PATENT DOCUMENTS

CN          111760282 A      10/2020
CN          111760288 A      10/2020
                    (Continued)

OTHER PUBLICATIONS

Sharky857, "I said: "Get TF To Extraction!"—Warframe 2021 05 15 19 32 26 400", https://www.youtube.com/watch?v=nOYLQ9-c1tk, Sep. 3, 2021 (Year: 2021).*
                    (Continued)

*Primary Examiner* — Michael A Cuff
(74) *Attorney, Agent, or Firm* — BCF LLP

(57)            ABSTRACT

An in-game information processing method an electronic device, and a storage medium are provided. The method includes: in response to current virtual battle mission meeting preset condition, controlling generation of at least one target area in virtual scene; generating at least one corresponding position mark, in a position corresponding to orientation information in the scene map corresponding to scene map control, and generating at least one area mark control corresponding to the at least one target area in control interface, according to orientation information of the at least one target area in the virtual scene; in response to activation behavior of virtual object in the target area, adjusting display parameter of the area mark control accord-
                    (Continued)

ing to obtained current area state information; in response to evacuation behavior of the virtual object in the target area, determining that the virtual object has completed evacuation from the target area.

20 Claims, 5 Drawing Sheets

(58) Field of Classification Search
USPC ........................................... 463/31
See application file for complete search history.

(56) References Cited

U.S. PATENT DOCUMENTS

| | | | |
|---|---|---|---|
| 2013/0169423 A1 | 7/2013 | Iorgulescu et al. | |
| 2015/0157932 A1* | 6/2015 | Kwon ................... | G06Q 50/00 463/31 |
| 2018/0001189 A1* | 1/2018 | Tang ....................... | A63F 13/42 |
| 2019/0275429 A1* | 9/2019 | Yang ....................... | A63F 13/50 |
| 2021/0146248 A1 | 5/2021 | Chen | |
| 2021/0370177 A1* | 12/2021 | Li ....................... | A63F 13/5255 |

FOREIGN PATENT DOCUMENTS

| | | |
|---|---|---|
| CN | 112057860 A | 12/2020 |
| CN | 112190928 A | 1/2021 |
| CN | 113546419 A | 10/2021 |

OTHER PUBLICATIONS

Igcompany, "Army Evacuation Mission—Of Their Own Accord—Call of Duty: Modern Warfare 2", https://www.youtube.com/watch?v=n03_dTCVI5w, Jul. 7, 2018 (Year: 2018).*
International Search Report issued by the International Searching Authority of China in connection with International Application No. PCT/CN2022/107993, 4 pages.
Written Opinion issued by the International Searching Authority of China in connection with International Application No. PCT/CN2022/107993, 4 pages.

\* cited by examiner

IN-GAME INFORMATION PROCESSING METHOD AND APPARATUS, ELECTRONIC DEVICE, AND STORAGE MEDIUM

CROSS-REFERENCE TO RELATED APPLICATION

The present disclosure is the U.S. National Stage Application of PCT International Application No. PCT/CN2022/107993, filed on Jul. 26, 2022, which is based upon and claims the priority to the Chinese patent application No. 202210265419.4 filed on Mar. 17, 2022 and entitled "INFORMATION PROCESSING METHOD AND APPARATUS IN GAME, ELECTRONIC DEVICE, AND STORAGE MEDIUM", the entire contents of both of which are incorporated by reference herein for all purposes.

TECHNICAL FIELD

The present disclosure relates to the technical field of games, in particular to an information processing method and apparatus in a game, an electronic device, and a storage medium.

BACKGROUND

With the development of the game industry, there are more and more kinds of games, such as third-personal shooting (TPS) games, which are loved by many players for their unique charm. In many TPS games, a survival gameplay of multiplayer fighting, that is, the gameplay of evacuation from a round of the game, has emerged. After participating in the battle, players need to collect supplies, find the evacuation area after meeting an escape condition, and can successfully evacuate from the current round of the game after staying in the evacuation area for a specified time.

At present, when players enter the current round of the game, they are usually informed of the number of evacuation areas in the current round and the fixed locations of the evacuation areas in the virtual scene in the interface of the current round of the game. However, it takes a long time for the players to find a fixed evacuation area by memory or exploration, which easily leads to slow game progress, low human-computer interaction efficiency and long game time for a single round.

SUMMARY

The present disclosure provides an information processing method and apparatus in a game, an electronic device, and a storage medium.

The first aspect of the present disclosure provides an information processing method in a game, including: in response to determining that a current virtual battle mission meets a preset condition, generating, by a terminal, a target area in a virtual scene, where a game interface is provided by the terminal, the game interface includes a game screen and a control interface, the game screen includes the virtual scene of the current virtual battle mission, and the control interface includes a scene map control; according to orientation information of the target area in the virtual scene, generating, by the terminal, a corresponding position mark at a position corresponding to the orientation information, in a scene map corresponding to the scene map control, and generating an area mark control corresponding to the target area in the control interface; in response to an activation behavior of a virtual object in the target area, obtaining current area state information of the target area, and adjusting a display parameter of the area mark control according to the current area state information to indicate the current area state information; and in response to an evacuation behavior of the virtual object in the target area, determining that the virtual object has completed evacuation from the target area.

The second aspect of the present disclosure provides an electronic device, including a processor, a memory and a bus, where the memory stores machine-readable instructions executable by the processor, where when the electronic device is running, the processor communicates with the memory through the bus, and the processor executes the machine-readable instructions to perform steps of an information processing method, with the information processing method including: in response to determining that a current virtual battle mission meets a preset condition, generating a target area in a virtual scene, where a game interface is provided by the electronic device, the game interface includes a game screen and a control interface, the game screen includes the virtual scene of the current virtual battle mission, and the control interface includes a scene map control; according to orientation information of the target area in the virtual scene, generating a corresponding position mark at a position corresponding to the orientation information, in a scene map corresponding to the scene map control, and generating an area mark control corresponding to the target area in the control interface; in response to an activation behavior of a virtual object in the target area, obtaining current area state information of the target area, and adjusting a display parameter of the area mark control according to the current area state information to indicate the current area state information; and in response to an evacuation behavior of the virtual object in the target area, determining that the virtual object has completed evacuation from the target area.

The third aspect of the present disclosure provides a non-transient transitory computer-readable storage medium, storing a computer program thereon, where the computer program, when run by a processor, performs steps of an information processing method, with the information processing method including: in response to determining that a current virtual battle mission meets a preset condition, generating a target area in a virtual scene, where a game interface is provided by a terminal, the game interface includes a game screen and a control interface, the game screen includes the virtual scene of the current virtual battle mission, and the control interface includes a scene map control; according to orientation information of the target area in the virtual scene, generating a corresponding position mark at a position corresponding to the orientation information, in a scene map corresponding to the scene map control, and generating an area mark control corresponding to the target area in the control interface; in response to an activation behavior of a virtual object in the target area, obtaining current area state information of the target area, and adjusting a display parameter of the area mark control according to the current area state information to indicate the current area state information; and in response to an evacuation behavior of the virtual object in the target area, determining that the virtual object has completed evacuation from the target area.

In order to make the above objects, features and advantages of the present disclosure more obvious and understandable, the following preferred embodiments will be described in detail with reference to the accompanying drawings.

BRIEF DESCRIPTION OF DRAWINGS

In order to illustrate the embodiments of the present disclosure more clearly, the accompanying drawings which need to be used in the description of the embodiments will be briefly introduced below. It is to be understood that the accompanying drawings below only show some embodiments of the present disclosure, so they shall not be regarded as limiting the scope. For a person ordinarily skilled in the art, other relevant drawings may be obtained in light of the accompanying drawings without any creative effort.

DETAILED DESCRIPTION

Figure 1:
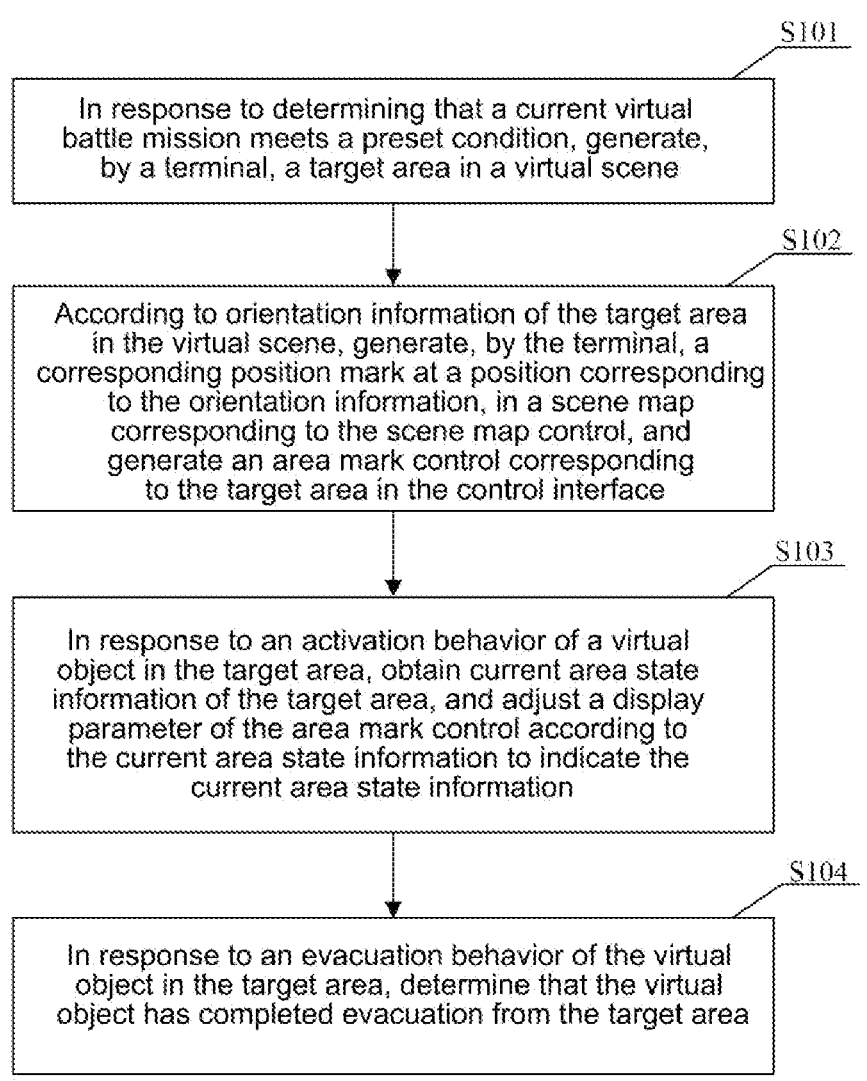
FIG. 1 is a flowchart of an information processing method in a game provided by an embodiment of the present disclosure.

In order to make the objectives, technical solutions and advantages of the embodiments of the present disclosure clearer, the technical solutions in the embodiments of the present disclosure will be clearly and completely described below with reference to the accompanying drawings in the embodiments of the present disclosure. Obviously, the described embodiments are only some rather than all of the embodiments of the present disclosure. Generally, the components of the embodiments of the present disclosure described and illustrated in the drawings herein may be arranged and designed in various different configurations. Therefore, the following detailed description of the embodiments of the present disclosure provided in the drawings is not intended to limit the claimed scope of protection of the present disclosure, but only represents selected embodiments of the present disclosure. Based on the embodiments of the present disclosure, every other embodiment obtained by those skilled in the art without making creative efforts shall fall within the scope of protection of the present disclosure.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

First, the terms involved in the embodiments of the present disclosure are briefly introduced as follows.

(1) Terminal

The terminal involved in the embodiments of the present disclosure mainly refers to a terminal which is configured for providing a graphical user interface and can control the virtual object. The terminal may be a local terminal mentioned below or a client device in a cloud interactive system. The terminal may include, but is not limited to, any of the following devices: notebook computer, smart phone, tablet computer, desktop computer, game machine, MP4 (moving picture experts group audio layer IV) player, personal digital assistant (PDA), e-book reader, etc. A game-supporting application program, such as an application program that supports three-dimensional games or two-dimensional games, is installed and run in the terminal. In the embodiments of the present disclosure, the application program is introduced as a game application. In some examples, the application program may be a stand-alone version, such as a stand-alone version of a 3D game program, or an online version of an application program.

(2) Graphical User Interface

The graphical user interface refers to an interface display format for communication between a human and a computer, allowing the user to manipulate icons, marks or menu options on the screen by using input devices such as a mouse or a keyboard, and also allowing users to manipulate icons or menu options on the screen by performing touch operations on the touch screen of a touch terminal to select commands, start programs or perform other missions.

(3) Game Interface

The game interface refers to the screen corresponding to the application program provided or displayed through the graphical user interface, where the screen includes the UI interface and the game screen for the player to interact. In some examples according to the present disclosure, the UI interface may include a play control (such as a skill control, a movement control, a function control, etc.), an indication mark (such as a direction indication mark, a character indication mark, etc.), an information display area (such as for displaying kill counts, game time, etc.), or a game setting control (such as for system setting, stores, gold coins, etc.). In some examples according to the present disclosure, the game screen is a display screen corresponding to the virtual scene displayed by the terminal, and the game screen may include virtual objects such as game characters, NPC characters, AI characters, etc., which execute game logic in the virtual scene.

(4) Virtual Scene

The virtual scene is a game scene that is displayed (or provided) when an application program is run on a terminal or a server, that is, a scene used during a normal game. In other words, the virtual scene refers to a virtual game control that carries a virtual object during the game, and the virtual object can move, release skills and perform other actions under the control of the operating instructions given by the user (that is, the player) to the terminal in the game scene. In some examples, the game scene may be a simulation environment for the real world, a semi-simulation and semi-fictional virtual environment, or a purely fictional virtual environment. The game scene may be any one of a two-dimensional virtual scene, a 2.5-dimensional virtual scene and a three-dimensional virtual scene, and the virtual environment may be a sky, a land, an ocean, etc., where the land includes environmental elements such as a desert and a city, etc. The game scene is a scene where the user controls the whole game logic of the virtual object. In some examples, the game scene may also be used for a game scene battle between at least two virtual objects, in which there are virtual resources available for the at least two virtual objects. The game scene may include any one or more of the following elements: game background elements, play object elements, game prop elements, game supply elements, etc.

(5) Virtual Object

The virtual object is a dynamic object that can be controlled in a virtual scene. In some examples, the dynamic object may be a virtual character, an animated character, etc. The virtual object is a character controlled by the player through an input device, or Artificial Intelligence (AI) trained for battle in the virtual environment. In some examples, the virtual object is a virtual character competing in the virtual scene. In some examples, the number of virtual objects in the virtual scene battle is preset or dynamically determined according to the number of clients participating in the battle, which is not limited by the embodiments of the present disclosure. In one possible example, the user can control the virtual object to move in the virtual scene, for example, control the virtual object to run, jump, crawl, etc., and can control the virtual object to use the skills and virtual props, etc. provided by the application program to fight with other virtual objects. In some examples, when the virtual environment is a three-dimensional virtual environment, the virtual object may be a three-dimensional virtual model, and each virtual object has its own shape and volume in the three-dimensional virtual environment, occupying a part of space in the three-dimensional virtual environment. In some examples, the virtual object is a three-dimensional character constructed based on the three-dimensional human skeleton technology, and the virtual object achieves different appearances by wearing different skins. In some examples, the virtual object may also be implemented by using a 2.5-dimensional or two-dimensional model, which is not limited by the embodiments of the present disclosure.

(6) Virtual Battle Mission

The virtual battle mission includes the virtual scene, as well as the virtual object controlled by the player in the virtual scene and other virtual objects. The virtual object is a virtual object controlled by a player who uses a first terminal, and other virtual objects are the virtual objects controlled by other players who have participated in the current virtual battle mission together. Here, the virtual object and the other virtual objects belong to the same virtual camp.

The information processing method in the game provided by the embodiments of the present disclosure may be run on a local terminal or a server. When the information processing method in the game runs on the server, the information processing method may be implemented and performed based on a cloud interactive system, where the cloud interactive system includes the server and a client device.

In some examples according to the present disclosure, various cloud applications may be run under the cloud interactive system, such as cloud gaming. Taking the cloud gaming as an example, the cloud gaming refers to a game mode based on cloud computing. In the running mode of cloud gaming, the running subject of the game program and the presenting subject of game screens are separated, and the storage and running of the information processing method is completed on the cloud gaming server. The role of the client device is to receive and send data and present game screens. For example, the client device may be a display device with data transmission function and close to the user side, such as a mobile terminal, a TV, a computer, a PDA, etc. However, the information processing is performed by a cloud gaming server in the cloud. When playing a game, the player operates the client device to send an operation instruction to the cloud gaming server. The cloud gaming server runs the game according to the operation instruction, encodes and compresses the data such as game screens, and returns them to the client device through the network. Finally, the client device decodes and outputs the game screens.

In some examples according to the present disclosure, the local terminal stores the game program and is configured for presenting the game screens. The local terminal is configured for interacting with the player through the graphical user interface, that is, the game program is conventionally downloaded and installed through the electronic device and run. The graphical user interface may be provided to the player by the local terminal in various ways, for example, it may be rendered and displayed on the display screen of the terminal, or it may be provided to the player through holographic projection. For example, the local terminal may include a display screen for presenting a graphical user interface which includes a game screen; and a processor for running the game, generating the graphical user interface, and controlling the display of the graphical user interface on the display screen.

Second, the applicable application scenarios of the present disclosure are introduced as follows. The present disclosure may be applied to the technical field of games. Taking the third-personal shooting (TPS) games as an example, in many TPS games, a survival gameplay of multiplayer fighting, that is, the gameplay of evacuation from a round of the game, has emerged. After participating in the battle, a player needs to collect supplies, find the evacuation area after meeting the escape condition, and can successfully evacuate from the current round of the game after staying in the evacuation area for a specified time.

In related examples, after participating in the battle, the player needs to collect supplies in a first virtual scene in a first game phase; and when the escape condition is met and the player has successfully evacuated from the evacuation area, they win. The player may compete with each other in the limited maps and resources corresponding to the first virtual scene, collect supplies such as various guns in the game, upgrade scopes of the guns, and collect some equipment (such as helmets, backpacks and flashbombs) and healing items. During the period of collecting supplies in the first virtual scene, the player may be attacked by other players and be "eliminated". After the player enters the second game phase, he/she can see that there are several evacuation areas on the map, and countdowns are displayed at the same time, and the time of each countdown is different. When the countdown is over, the player can evacuate from the evacuation area in the second virtual scene, and the current round of the game can be completed after the evacuation.

As an example, the first game phase may be performed in the first virtual scene, and the second game phase may be performed in a second virtual scene. The second virtual scene may be an evacuation area added on the basis of the first virtual scene, and the evacuation area is configured for the game player to evacuate from the current round of the game. In fact, the safe area where game player can conduct activities is gradually shrinking with the game progress, so the free activity space of the first virtual scene is actually larger than the free activity space of the second virtual scene, and the free activity space of the second virtual scene is within the range of the free activity space of the first virtual scene. The evacuation area may be replaced by a special mark in the virtual scene, such as "red smoke", and "green fog", etc. If the special mark appears in the virtual scene, the area with the special mark can be considered as the evacuation area, and then the player can find the evacuation area according to the special mark.

In response to the condition that the number of players who have completed the game preparation phase reaches a first preset number, the virtual object that has completed the game preparation phase is controlled to enter the first game phase. In the process of the first game phase, in response to the interactive behavior of the virtual object in the virtual scene in the first game phase, the virtual object is controlled to move in the virtual scene and pick up supplies. Specifically, the condition that the number of players who have completed the game preparation phase reaches the first preset number is for controlling the start of the current round of the game, which can be understood as that the game player sends the start request of the current round of the game to the server through the terminal, and after the server receives the start request of the current round of the game, the server determines whether the received start request of the game player meets the start condition of the current round of the game, and if so, the server controls the current round of the game to start. Specifically, the start condition of the current round of the game (the start condition of the game search phase) may include: the number of players participating in the current round of the game reaches the first preset number, for example, if the number of players participating in the current round of the game reaches 100, 120 or 140, etc., then the current round of the game starts; and the online time duration of the virtual object participating in the current round of the game is not greater than the preset limit time duration specified by the game, for example, in order to prevent the game player from playing for too long and affecting eyesight, the server sets a preset limit time duration, and if the online time duration of the game exceeds the preset limit time duration, the server will force the game player to quit the current round of the game. The interactive behavior refers to the behavior of conducting activities by the virtual object manipulated by a player in the virtual scene. The behavior of conducting activities by the virtual object in the virtual scene may include, but not limited to, at least one of the following: walking, running, jumping, climbing, getting down, attacking, releasing skills, picking up supplies, and sending messages. Here, the virtual object conducting activities in the virtual scene includes not only the virtual object controlled by the player, but also virtual objects controlled by other players or other virtual objects that are not controlled by the players.

While it is found through research that in the existing related games, when the player enters the current round of the game, he/she is usually informed of the number of evacuation areas and the fixed locations of the evacuation areas in the virtual scene in the interface of the current round of the game. However, the relevant prompts will not be shown in the game interface, only when the player enters the evacuation area, the corresponding prompt information will be displayed in the game interface to inform the player that he/she can leave the round of game after staying in the evacuation area for a specified time. Because the evacuation area needs to be explored by the player himself or searched by memory after the player is familiar with the game, in the process of searching for the evacuation area by memory or exploration, once the evacuation area that the player has arrived at has been destroyed or the number of evacuees in the evacuation area has reached an upper limit, etc., the player needs to leave the evacuation area and continue to find a new evacuation area to complete the evacuation, which undoubtedly consumes a lot of time for the player, resulting in slow game progress, low human-computer interaction efficiency and long game time for a single round.

Based on this, the embodiments of the present disclosure provides an information processing method and apparatus in a game, an electronic device, and a storage medium, which enable the player to grasp the current area state information of the target area for evacuation in real time during the game, and is helpful for the player to arrive at the target area for evacuation quickly and complete the evacuation in time, thus reducing the time consumption for the player to search the target area for evacuation during the game, speeding up the game progress, improving the efficiency of human-computer interaction, making the game time of a single virtual battle mission not too long, and reducing the waste of terminal processing resources and power resources.

An implementation environment provided by an embodiment of the present disclosure may include a first terminal, a game server, and a second terminal. The first terminal and the second terminal communicate with the server respectively to implement data communication. In this example, the first terminal and the second terminal are respectively installed with clients for performing the information processing method provided by the present disclosure, and the game server is a server for performing the information processing method provided by the present disclosure.

Through the clients, the first terminal and the second terminal can communicate with the game server respectively.

Taking the first terminal as an example, the first terminal establishes communication with the game server by running the client. In some examples according to the present disclosure, the server establishes the current virtual battle mission according to the game request of the client. The parameter of the current virtual battle mission may be determined according to the parameter in the received game request. For example, the parameter of the current virtual battle mission may include the number of people participating in the virtual battle mission, the levels of characters participating in the virtual battle mission, etc. When the first terminal receives the response from the server, the virtual scene corresponding to the virtual battle mission is displayed through the graphical user interface of the first terminal. In some examples according to the present disclosure, the server determines the current virtual battle mission for the client from a plurality of established virtual battle missions according to the game request of the client, and when the first terminal receives the response from the server, the virtual scene corresponding to the current virtual battle mission is displayed through the graphical user interface of the first terminal. The first terminal is a device controlled by a first user, the virtual object displayed in the graphical user interface of the first terminal is a virtual object controlled by the first user, and the first user inputs operation instructions through the graphical user interface, so as to control the virtual object to perform corresponding operations in the virtual scene.

Taking the second terminal as an example, the second terminal establishes communication with the game server by running the client. In some examples according to the present disclosure, the server establishes the current virtual battle mission according to the game request of the client. The parameter of the current virtual battle mission may be determined according to the parameter in the received game request. For example, the parameter of the current virtual battle mission may include the number of people participating in the virtual battle mission, the levels of characters participating in the virtual battle mission, etc. When the second terminal receives the response from the server, the virtual scene corresponding to the current virtual battle mission is displayed through the graphical user interface of the second terminal. In some examples according to the present disclosure, the server determines the current virtual battle mission for the client from a plurality of established virtual battle missions according to the game request of the client, and when the second terminal receives the response from the server, the virtual scene corresponding to the current virtual battle mission is displayed through the graphical user interface of the second terminal. The second terminal is a device controlled by a second user, the virtual object displayed in the graphical user interface of the second terminal is a virtual object controlled by the second user, and the second user inputs operation instructions through the graphical user interface, so as to control the virtual object to perform corresponding operations in the virtual scene.

The server performs data calculation according to the game data reported by the first terminal and the second terminal, and synchronizes the calculated game data to the first terminal and the second terminal, so that the first terminal and the second terminal control the graphical user interface to render corresponding virtual scenes and/or virtual objects according to the synchronized data sent by the server.

Herein, the virtual object controlled by the first terminal and the virtual object controlled by the second terminal are virtual objects in the same round of the virtual battle mission. The virtual object controlled by the first terminal and the virtual object controlled by the second terminal may have the same object attributes or different object attributes.

It should be noted that the virtual objects in the current virtual battle mission may include two or more virtual objects, and different virtual objects may correspond to different terminals, respectively, that is, in the current virtual battle mission, there are more than two terminals to perform transmission and synchronization of game data with the game server respectively.

Please refer to FIG. 1, which is a flowchart of an information processing method in a game provided by an embodiment of the present disclosure. As shown in FIG. 1, in the embodiment of the present disclosure, a game interface is provided through a terminal, the game interface includes a game screen and a control interface, the game screen includes a virtual scene of a current virtual battle mission, and the control interface includes a scene map control. The method includes:

S101: in response to the current virtual battle mission meeting a preset condition, controlling generation of at least one target area in the virtual scene;

S102: according to orientation information of the at least one target area in the virtual scene, generating at least one corresponding position mark in a position corresponding to the orientation information in the scene map corresponding to the scene map control, and generating at least one area mark control corresponding to the at least one target area in the control interface;

S103: in response to an activation behavior of a virtual object in the target area, obtaining current area state information of the target area, and adjusting a display parameter of the area mark control according to the current area state information to indicate the current area state information; and S104: in response to an evacuation behavior of the virtual object in the target area, determining that the virtual object has completed evacuation from the target area.

The terminal involved in the present embodiment is mainly an intelligent device that is configured for providing a game interface and can control and operate a virtual object. The terminal may be the aforementioned local terminal or the aforementioned client device in the cloud interactive system.

The game interface includes a game screen and a control interface. The game screen includes the virtual scene of the current virtual battle mission, the control interface includes a scene map control, the scene map control corresponds to the scene map, and the scene map is for assisting the player to determine the position of the virtual object controlled by him in the virtual scene. In addition, at least one area mark control corresponding to at least one target area may be generated in the control interface, and the area mark control corresponds to the current area state information of the target area.

The following takes the above information processing method in a game run on a local terminal (hereinafter referred to as the terminal) as an example for illustration of the above-mentioned steps provided by the embodiments of the present disclosure.

In step S101, in response to the current virtual battle mission meeting the preset condition, generation of at least one target area in the virtual scene is controlled.

In the embodiment of the present disclosure, the virtual scene of the current virtual battle mission may include the above-mentioned virtual scene corresponding to the competitive mode of TPS games. The virtual scene in this competitive mode may be the same as the first virtual scene in the first game phase or the second virtual scene in the second game phase. The virtual objects controlled by players may conduct activities freely in the virtual scene of the current virtual battle mission. The activities of the virtual objects in the virtual scene may include, but not limited to, at least one of the following: walking, running, jumping, climbing, getting down, attacking, releasing skills, picking up props and sending messages. Here, the virtual objects conducting activities in the virtual scene include not only the virtual objects controlled by the players, but also other virtual objects that are not controlled by the player.

Here, the target area is also called the evacuation area, which is configured for providing a place for virtual objects to evacuate. The virtual object can complete evacuation from the target area after performing evacuation behavior in the target area.

In a specific embodiment, the preset condition includes at least one of that:

(1) a game progress of the current virtual battle mission reaches a preset time point;

(2) the virtual object in the current virtual battle mission arrives at a designated position, where the designated position is a generation position of any target area in the virtual scene or a preset trigger position in the virtual scene for triggering the generation of any target area;

(3) a number of surviving virtual objects in the current virtual battle mission reaches a preset number; or (4) a ratio of a first area in the virtual scene to the whole virtual scene reaches a preset numerical value, where the first area is an area for restricting the virtual object from executing the virtual battle mission determined according to an area restriction and shrinkage rule.

The following is a detailed description of four situations included in the preset condition.

(1) A game progress of the current virtual battle mission reaches a preset time point.

In an embodiment, the preset time point may be a fixed time point preset by the game system, which may be a time point uniformly required in the game mechanism. For example, when the game progress of the current virtual battle mission reaches 20 minutes, the generation of the target area in the virtual scene is triggered.

In this way, because the player knows the fixed time point when the target area is generated in advance, he may prepare for entering the target area in advance, avoiding the situation that the player misses the evacuation opportunity due to unclear of the generation time of the target area, thereby speeding up the game progress and improving the efficiency of human-computer interaction.

In another embodiment, the preset time point may be a random time point preset by the game system, which may be a time point randomly set in the game mechanism. For example, when the game progress of the current virtual battle mission reaches 15 minutes, 20 minutes, 25 minutes, or 30 minutes, the generation of the target area in the virtual scene is triggered.

Here, because the time point when the target area is generated in each virtual battle mission is a random time point, and the program code for the random time point in the computer is relatively uncomplicated, a balance can be established between the computer resources and the player's feeling of game experience, and the player's feeling of game experience is improved without consuming a lot of computer resources, thus achieving the effect of game balance.

(2) The virtual object in the current virtual battle mission arrives at a designated position, where the designated position is a generation position of any target area in the virtual scene or a preset trigger position in the virtual scene for triggering the generation of any target area.

Here, the designated position may be set close to the central area of the virtual scene, or be set close to a position where the evacuation area is about to appear in the virtual scene. A fixed refresh point may be set in the virtual scene to refresh the designated position, or the designated position may be refreshed randomly in the virtual scene. In addition, any virtual object in the current virtual battle mission may trigger the generation of the target area when it arrives at the designated position.

In an embodiment, the designated position may be the generation position of any target area in the virtual scene, that is, when the virtual object in the current virtual battle mission arrives at the generation position of the target area in the virtual scene, the target area may be triggered to be generated immediately.

In this way, the player can enter the target area to evacuate without waiting for the target area to be generated, which saves time, reduces the interaction operation between the player and the terminal for arriving at the target area, improves the interaction efficiency, and speeds up the game progress. At the same time, there is no need to set the program code for the preset time point in the computer, and the computer resources can be reduced to improve the game performance.

In another embodiment, the designated position may be a preset trigger position in the virtual scene for triggering the generation of any target area. Here, several trigger markers for triggering the generation of the target area may be set at the trigger position in the virtual scene, and at least one target area can be controlled to be generated in the virtual scene in response to the trigger behavior of the virtual object for the trigger markers.

In this way, there is no need to set the program code for the preset time point in the computer, and the computer resources can be reduced to improve the game performance.

(3) Number of surviving virtual objects in the current virtual battle mission reaches a set number.

In this step, the set number is used as the start condition for the game system to determine the generation of the target area. In the process of the current virtual battle mission, if the number of surviving virtual objects reaches the set number, the generation of the target area in the virtual scene is triggered.

The set number may be determined by the game developer according to the numerical value set by the game design, or may be determined by intelligent analysis of the historical data in the virtual battle mission through artificial intelligence technologies.

(4) a ratio of a first area in the virtual scene to the whole virtual scene reaches a preset numerical value, where the first area is an area for restricting the virtual object from executing the virtual battle mission determined according to an area restriction and shrinkage rule.

Here, the execution of the virtual battle mission by the virtual object in the first area will be restricted by an area restriction and shrinkage rule of the first area. The area restriction and shrinkage rule refers to a rule that the area attributes of the first area can restrict the virtual object in the first area from performing the virtual battle mission. The area attributes may include toxicity, special geographical attributes and harsh environmental attributes. First, the health point of the virtual object in the first area may be continuously consumed according to the toxicity of the first area. For example, the first area is a "poison circle", and the health point of the virtual object in the "poison circle" is continuously reduced, so that the virtual object will be restricted from performing the virtual battle mission in the "poison circle". If the virtual object exists in the "poison circle" for a long time, its health point will be consumed until the virtual object is eliminated. Second, the consumption of corresponding attribute values of the virtual object in the first area may be determined according to the special geographical attributes of the first area. If the first area is a desert, the water content value of the virtual object in the desert will be consumed, and if the first area is a seabed, the oxygen value of the virtual object in the seabed will be consumed. Third, the consumption of corresponding attribute values of the virtual object in the first area may be determined according to the harsh environmental attributes of the first area, and the weather conditions corresponding to environmental parameter may include wind, rain, snow, hail, sandstorm, etc. Once the above weather conditions occur in the first area, the virtual object in the first area will become difficult to perform virtual battle missions due to the above weather conditions, and the execution efficiency of virtual battle missions are reduced.

With the advancement of the game progress of the virtual battle mission, the area of the first area in the virtual scene is continuously expanding with time. When the ratio of the first area in the virtual scene to the whole virtual scene reaches a preset numerical value, the generation of the target area in the virtual scene may be triggered.

For example, a "poison circle" will be randomly generated in the virtual scene. With the increase of the number of the "poison circle", the safe area in the whole virtual scene will be continuously shrinking. According to the preset numerical value set by the game system, when the ratio of the area of the first area to the whole virtual scene reaches the preset numerical value, it can be determined that the target area in the virtual scene is generated.

The preset numerical value may be determined by the game developer according to the numerical value set by the game design, or may be determined by intelligent analysis of the historical data in the virtual battle mission through artificial intelligence technologies.

Here, with the advancement of the game progress of the virtual battle mission, the first area is continuously expanding. Because the first area can restrict the virtual objects from executing the virtual battle mission, the virtual objects will avoid the first area as much as possible. In this way, all the virtual objects in the current virtual battle mission always move towards some common areas, compete for resources and fight in this area, which helps to advance the game progress, so that the game time of a single virtual battle mission will not be too long, and the waste of terminal processing resources and power resources will be reduced.

In addition, step S101 further includes: synchronizing the notification information of at least one target area generated in the virtual scene to all the surviving virtual objects in the current virtual battle mission.

In the current virtual battle mission, the message that "the evacuation point has appeared" is notified globally when the target area is just generated to inform the player who is playing the game that the target area has been generated, so as to remind the player that he can arrive at the target area and evacuate, thus indirectly improving the efficiency of human-computer interaction.

In step S102, according to the orientation information of at least one target area in the virtual scene, at least one corresponding position mark is generated in the position corresponding to the orientation information in the scene map corresponding to the scene map control, and at least one area mark control corresponding to at least one target area is generated in the control interface.

In the embodiment of the present disclosure, the orientation information of at least one target area in the virtual scene refers to the orientation position of at least one target area in the virtual scene, and the player may find the target area according to the orientation position of the at least one target area in the virtual scene. Correspondingly, according to the orientation information of at least one target area in the virtual scene, the generation position of at least one position mark in the scene map corresponding to the scene map control is determined. Here, the generation position of at least one position mark in the scene map corresponding to the scene map control corresponds to the orientation information of at least one target area in the virtual scene, where the orientation information of the virtual scene, at least one target area, and at least one target area in the virtual scene is displayed in the scene map corresponding to the scene map control according to the set size.

Here, the position mark in the scene map corresponds to the position of the target area in the virtual scene, and is configured for indicating the mark corresponding to the position of the target area in the virtual scene. In the specific example, in order to distinguish the position marks corresponding to different target areas, the shape and/or color of each position mark may be set to be different.

At the same time, at least one area mark control corresponding to at least one target area is generated in the control interface. The area mark control is configured for displaying the current area state information of the target area, and the display parameter of the area mark control may be adjusted according to the current area state information of the target area to indicate the current area state information. The display position of the control interface on the game interface is set in a conspicuous position on the game interface without affecting the line of sight of the player picking up supplies, such as the position slightly above the center of the game interface.

Besides, step S103 further includes: according to the position information of the virtual object in the virtual scene, generating a corresponding object mark in the position corresponding to the position information in the scene map corresponding to the scene map control, where the position of the object mark in the scene map is configured for referring to the position of the virtual object in the virtual scene.

Both the object mark and the position mark may include any one of the following: letter mark, text mark, numeric mark, graphic mark, and special symbol mark. In order to distinguish them easily, the object mark and the position mark may be set to different kinds of marks, or may be set to different colors, so as to show the object mark and the position mark to the player more intuitively.

In this way, when the position mark corresponding to the position of the target area in the virtual scene is generated in the scene map, at least one area mark control corresponding to at least one target area is generated in the control interface to indicate the current area state information, so that the player can still grasp the current area state information of the target area without arriving at the target area for evacuation, avoiding the player from missing the evacuation opportunity, and improving the efficiency of human-computer interaction.

In step S103, in response to the activation behavior of the virtual object in the target area, the current area state information of the target area is obtained, and the display parameter of the area mark control is adjusted according to the current area state information to indicate the current area state information.

In the embodiment of the present disclosure, in response to the activation behavior of the virtual object in the target area, the target area is activated, and the current area state information of the activated target area is obtained, the display parameter of the area mark control is adjusted according to the current area state information to indicate the current area state information, and the current area state information is displayed on the control interface.

The current area state information refers to the current stage when the virtual object leaves the virtual scene of the current virtual battle mission. Specifically, the current area state information includes any one of: a starting-to-leave state, a ready-to-leave state, a waiting-to-leave state, a cool-down state, or a destroyed state. The following is a detailed introduction of these current area state information.

(1) The starting-to-leave state is configured for indicating that a target area appears in the virtual scene and the target area is in an activated state, so as to inform the player that he can arrive at the target area in the virtual scene to evacuate, which achieves an effect of prompting the player to evacuate.

The presentation form of the starting-to-leave state on the area mark control may be replaced by a starting-to-leave state mark, such as a letter with a box, a number with a box, different graphics, etc. When the target area is in the starting-to-leave state, the starting-to-leave state mark may be displayed in the control interface.

(2) The ready-to-leave state is configured for indicating that the virtual object has arrived at the target area in the activated state and is in a ready-to-leave state. For example, the ready-to-leave state may be a state of calling a vehicle or a state in which the virtual object just arrives at the target area for a period of timer. The vehicle may include an airplane, a helicopter, a vehicle, a ship, etc.

In some examples, the presentation form of the ready-to-leave state on the area mark control may be replaced by the ready-to-leave state mark, and the ready-to-leave state mark may be presented in the form of progress bar, the form of percentage, and the form of time countdown, etc.

When the ready-to-leave state mark is presented in the form of a progress bar, the progress bar corresponding to the ready-to-leave state mark is displayed on the game interface. The total length of the progress bar indicates the time of ready-to-leave, for example, it may be the time of calling the vehicle, and the movement mark on the progress bar is for indicating the time change information in real time, for example, the position of the movement mark on the progress bar is for indicating the progress information of calling the vehicle.

As an example, the ready-to-leave state mark may add some dynamic special effects on the basis of the starting-to-leave state mark. For example, when the starting-to-leave state mark is a letter with a box, the box of the letter has a progress bar, and the progress bar changes with time, and the moving direction of the progress bar may be clockwise around the box.

When the ready-to-leave state mark is presented in the form of percentage, the presentation form of percentage may be a disk, a box, etc, and the whole disk or box is for indicating the time of ready-to-leave, the colored area on the disk or box is for indicating time change information in real time, and the proportion of colored areas on the disk or box on the whole disk or box is used to indicate the time change progress information. For example, the proportion of colored areas on the whole disk or box is for indicating the progress information of calling the vehicle.

When the ready-to-leave state mark is presented in the form of time countdown, the reminder information of time countdown is set on the ready-to-leave state mark. Here, the change information of time countdown is for indicating the progress information of calling the vehicle, and the progress of calling the vehicle gradually increases with the continuous reduction of time countdown.

(3) The waiting-to-leave state is for indicating that the virtual object arrives at the target area in the activated state and is in the waiting-to-leave state. For example, the waiting-to-leave state may be the state of the vehicle waiting after arriving at the target area, or may be the state of the virtual object staying in the target area in the activated state.

In some examples, the presentation form of the waiting-to-leave state on the area mark control may be replaced by the waiting-to-leave state mark, and the waiting-to-leave state mark may also be presented in the form of progress bar, the form of percentage, and the form of time countdown, etc.

When the waiting-to-leave state mark is presented in the form of a progress bar, the progress bar corresponding to the waiting-to-leave state mark is displayed on the game interface. The total length of the progress bar indicates the waiting-to-leave time, for example, it may be the time for the vehicle to wait after arriving, and the movement mark on the progress bar is for indicating the change information of the time for the vehicle to wait after arriving, for example, the position of the movement mark on the progress bar is for indicating the progress information of the time for the vehicle to wait after arriving.

For example, the waiting-to-leave state mark may be a box with a vehicle graphic, and the box has a progress bar. The progress bar changes with time to indicate that the time for the vehicle to wait after arriving is continuously consumed. When the progress bar fills the whole box, it indicates that the time for the vehicle to wait after arriving is over, triggering the vehicle to fly away from the target area. The direction of the progress bar may be clockwise around the box.

When the ready-to-leave state mark is presented in the form of percentage, the form of percentage may be a disk, a box, etc. The whole disk or box is for indicating the waiting-to-leave time, and the colored area on the disk or box is for indicating the change information of the time for the vehicle to wait after arriving, that is, the proportion of the colored area on the disk or box on the whole disk or box is used to indicate the time change information. For example, the proportion of the colored area on the whole disk or box is for indicating the progress information of the time for the vehicle to wait after arriving.

For example, the waiting-to-leave state mark may be a box with a vehicle graphic. As the time for the vehicle to wait for after arriving is continuously consumed, the colored area gradually fills the whole box. Alternatively, the waiting-to-leave state mark may be a box with a vehicle graphic, and the box is filled with color. As the time for the vehicle to wait after arriving is continuously consumed, the colored area is gradually shrinking until the whole box is completely covered with shadow (the shadow area indicates the time that the vehicle has waited for), and at this time, it means that the waiting time of the vehicle has reached a predetermined time duration, and the vehicle flies away immediately.

When the waiting-to-leave state mark is displayed in the form of time countdown, a reminder information of time countdown is set on the waiting-to-leave state mark. Here, the change information of time countdown is for indicating the progress information of the time for the vehicle to wait after arriving. With the continuous reduction of time countdown, the time for the vehicle to wait after arriving is gradually consumed, and when the time the vehicle waits for after arriving is over, the vehicle is triggered to fly away from the evacuation area.

(4) The cool-down state is for indicating the state in which the virtual object successfully leaves the target area in the activated state and the current target area is cooled down for a period of time, so as to inform the player that he has successfully left the target area and won.

For example, the presentation form of the cool-down state on the area mark control may be replaced by the cool-down state mark. The cool-down state mark may be a box with a letter, and there is a cool-down duration set on it. The cool-down duration is for indicating the time when the next vehicle may be called, that is, under the cool-down duration indicated by the cool-down state, the target area is in an invalid state, that is, the virtual object cannot leave the target area.

(5) The destroyed state is for indicating that the target area has been destroyed, and the condition for being destroyed includes being covered by the first area.

For example, the presentation form of the destroyed state on the area mark control may be replaced by the destroyed state mark, which may be a box with a letter and a diagonal line on the box. Because the area destroyed state mark is for indicating that the target area is destroyed, the area destroyed state mark may be set to gray to show in a vivid way that the target area is destroyed.

In some examples according to the present disclosure, the virtual scene will not be adjusted according to the area restriction and shrinkage rule, that is, the first area does not exist, and the current area state information does not include the destroyed state.

The embodiments of the present disclosure provide a variety of different current area state information of the target area, which helps the player to select the appropriate target area for evacuation according to the different current area state information, thus indirectly improving the efficiency of human-computer interaction and speeding up the game progress.

In addition, the presentation form of the current area state information mentioned above is vivid, which enables the player to be familiar with the current area state information corresponding to the area mark control displayed on the control interface, and improves the proficiency of the player in evacuating from the current virtual battle mission, thus indirectly improving the efficiency of human-computer interaction.

Figure 2:
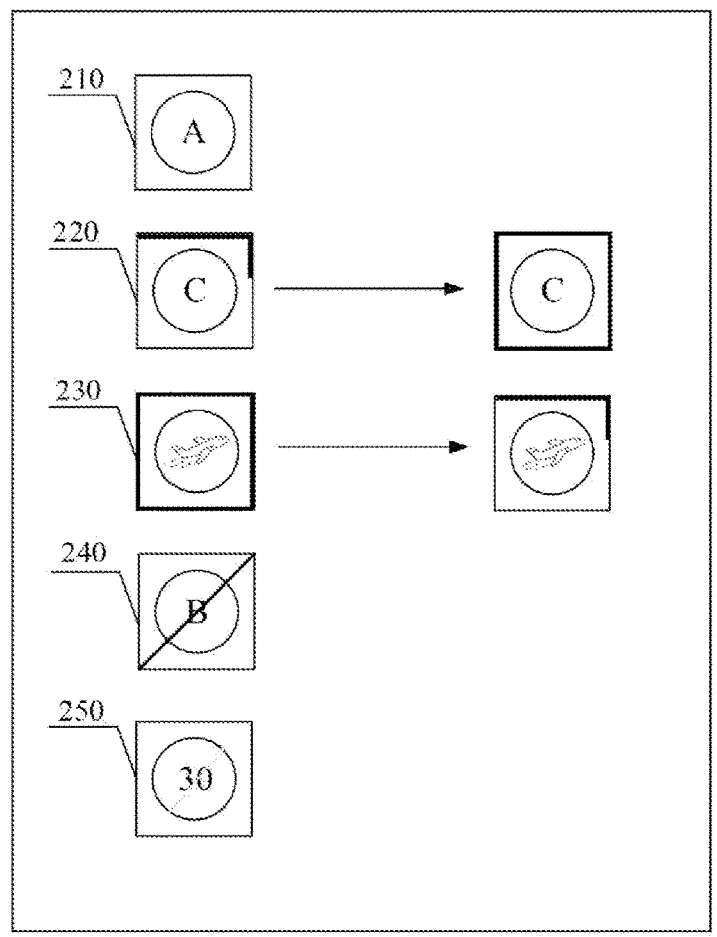
FIG. 2 is a schematic diagram of a presentation form of the current area state information provided by an embodiment of the present disclosure.

As shown in FIG. 2, a schematic diagram of a presentation form of current area state information provided by an embodiment of the present disclosure is shown. As shown in FIG. 2, a starting-to-leave state mark 210, a ready-to-leave state mark 220, a waiting-to-leave state mark 230, a cool-down state mark 250 and a destroyed state mark 240 are respectively shown. It should be noted that it is only a schematic diagram of the presentation form of the current area state information, and does not specifically limit the presentation form of the current area state information.

In the embodiments of the present disclosure, the activation behavior is configured for adjusting the inactivated target area to the activated target area. The activated target area is configured for providing the player with a space to evacuate from the current virtual battle mission. The activation behavior is configured for indicating that the server receives the activation instruction obtained by the terminal in response to the activation operation sent by the player to the terminal. As an example, the activation operation may be a click operation on an icon, a button or a block diagram with the activation function on the control interface, or a drag operation for the activation function control performed on the control interface. This activation behavior may be manifested as the virtual object arriving at the target area, such as the virtual object being controlled to flash or sprint to the target area.

In this way, the position mark in the scene map can remind the player of the moving direction and the moving route to the target area in the virtual scene; and the current area state information corresponding to the activated target area is configured for reminding the player of the area state information of the target area at the current moment, so that the player can select the target area suitable for the player to evacuate according to the area state information of the target area, and the player can arrive at the target area accurately and quickly to complete the evacuation, thus improving the efficiency of human-computer interaction.

For example, for the first target area and the second target area whose distances from the virtual object are basically the same, if the first target area is in the ready-to-leave state and the second target area is in the cool-down state, the player can give priority to the first target area for evacuation, because the second target area is already in the cool-down state, and even if the player arrives at the second target area, he cannot evacuate in a short time, which is helpful for the player to save the moving time to the target area, and the efficiency of human-computer interaction is indirectly improved.

In related examples, it is difficult to know the current area state information of the target area for evacuation, and it is difficult for the player to judge whether to search for the target area or continue to search for supplies according to the current area state information of the target area.

Based on this, in an embodiment, the current area state information of the target area may be synchronized to all the surviving virtual objects in the current virtual battle mission.

Here, the current area state information of the target area is synchronized to all the surviving virtual objects in the whole virtual battle, for example, the current area state mark for simultaneously displaying the current area state information of the target area in the scene map in the virtual battle, the scene map display area (the scene map display area can be opened by clicking the scene map), and the control interface, etc.

In this way, the current area state information of the target area in the whole virtual battle is synchronized, so that the player can know the current area state information of different target areas in the current virtual battle mission, and the player can still grasp the current area state information of the target area without arriving at the target area for evacuation, which is helpful for the player to quickly find the target area for evacuation according to the current area state information and complete evacuation in time, thus reducing the time consumption for the player to search for the target area for evacuation during the game, speeding up the game progress, improving the efficiency of human-computer interaction, making the game time of a single virtual battle mission not too long.

In another embodiment, the current area state information indicated by the display parameter of the adjusted area mark control may be sent to the game interface of at least one other virtual object, where the other virtual object belongs to the same camp as the virtual object.

Here, the player may update the current area state information about the target area in the game interface on his terminal according to the interaction with the teammates for the target area.

As an example, the current area state information of the target area activated by the virtual object can only be synchronized in the teammate's game interface in real time, so that the teammate can know the current area state information of different target areas in the round of the game, and the teammate can better carry out the next tactical deployment.

In this way, the player can be stimulated to arrive at the target area and activate the target area as soon as possible, so as to obtain a pre-requisite victory condition, which is helpful for the player who arrives at the target area first and his teammates to evacuate from the target area as soon as possible, reducing the time consumption of teammates in searching for the target area for evacuation during the game, speeding up the game progress to a certain extent, and improving the efficiency of human-computer interaction.

Since the target area for the evacuation of the virtual object can only be used after being actively activated by the player, in order to activate the target area in time to avoid delaying the game progress, the activation prompt information is displayed in the control interface in response to the virtual object entering the inactivated target area.

Here, the activation prompt information is for prompting the player to activate the target area at the current moment to an activated state. The activation prompt information may be text prompt information, voice prompt information, etc., so that the player can adjust the target area to that in the activated state in time.

In this way, the player is reminded to activate the target area through the activation prompt information, so that the player can activate the target area in time, and avoid delaying the evacuation of the virtual object in the virtual battle mission from the activated target area, thus helping to advance the game progress, and improving the efficiency of human-computer interaction.

Furthermore, after displaying the activation prompt information, in response to the activation behavior of the virtual object in the target area, the current area state information of the activated target area is obtained, and the current area state information of the activated target area is adjusted to a starting-to-leave state, and the display parameter of the area mark control is adjusted according to the starting-to-leave state.

When the virtual object enters the target area, the activation prompt information for reminding the player to perform activation operation is displayed on the control interface, and at the same time, an icon, a button, a block diagram or a control, etc. with the activation function are displayed on the game interface, and the touch instruction sent by the terminal in response to the player's touch control operation on the icon, the button, the block diagram or the control with the activation function is received, and the target area corresponding to the touch instruction is adjusted to that in an activated state in response to the touch instruction. Here, once the target area is in the activated state, the starting-toleave state mark is displayed on the control interface, and the global notification is made, so that all players participating in the current virtual battle mission know that they can arrive at the target area for evacuation, which is helpful to advance the game progress.

Figure 3:
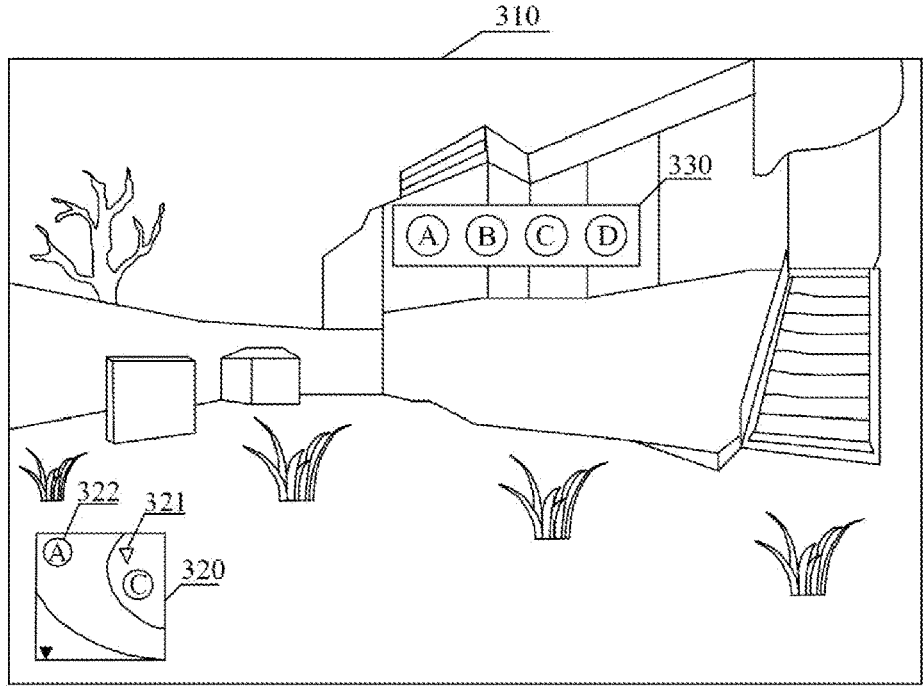
FIG. 3 is a schematic diagram of a game interface provided by an embodiment of the present disclosure.

For example, please refer to FIG. 3, which is a first schematic diagram of a game interface provided by an embodiment of the present disclosure. As shown in FIG. 3, when the target area in the virtual scene is activated, a scene map control 320 and an area mark control 330 are displayed in the game interface 310. The scene map control 320 includes the object mark 321 of the virtual object and the position mark 322 of the target area, and the current area state information of the target areas A, B, C and D is displayed in the area mark control 330, as shown in FIG. 3. The current area state information of the target areas A, B, C and D displayed in the area mark control 330 are all the starting-to-leave state at present. In this way, by displaying the current area state information of the activated target area in the control interface, it is helpful for the player to find, in combination with his position in the virtual scene, a suitable target area to evacuate, and it is helpful for the player to arrive at the target area for evacuation quickly and complete the evacuation in time, thus reducing the time consumption for the player to search for the target area for evacuation during the game, speeding up the game progress, and improving the efficiency of human-computer interaction.

As an example, the evacuation of the virtual object from the target area needs to go through the following steps:

step 1031: after the virtual object enters the activated target area, in response to a ready-to-leave behavior of the virtual object in the target area, obtaining the current area state information of the target area, adjusting the current area state information of the target area to a ready-to-leave state, and adjusting the display parameter of the area mark control according to the ready-to-leave state;

step 1032: after adjusting the current area state information of the target area to the ready-to-leave state, in response to a vehicle in the virtual scene being in the target area, obtaining the current area state information of the target area where the vehicle is located, adjusting the current area state information of the target area where the vehicle is located to a waiting-to-leave state, and adjusting the display parameter of the area mark control according to the waiting-to-leave state, where the vehicle is configured for carrying the virtual object to assist the virtual object to evacuate from the target area; and step 1033: generating a vehicle carrying capacity control in the control interface after adjusting the current area state information of the target area where the vehicle is located to the waiting-to-leave state; in response to the evacuation behavior of the virtual object in the target area, reducing a current carrying capacity of the vehicle, and adjusting the display parameter of the vehicle carrying capacity control according to the current carrying capacity of the vehicle to indicate the current carrying capacity of the vehicle; and in response to an evacuation condition that the virtual object satisfies in the target scene, determining that the virtual object has completed evacuation from the target area.

Steps 1031 to 1033 are illustrated below with examples.

In step 1031, after the virtual object enters the activated target area, the vehicle calling state mark is displayed on the control interface in response to the vehicle calling behavior of the virtual object in the virtual scene. Herein, the vehicle calling behavior is the ready-to-leave behavior.

In step 1032, after the vehicle in the virtual scene arrives at the target area, the vehicle waiting state mark is displayed on the control interface. The vehicle waiting state corresponding to the vehicle waiting state mark is the waiting-to-leave state.

Here, the current area state information may be indicated as the waiting-to-leave state by the fact that vehicle exists in the target area, so that the player can easily grasp the current area state information, thus improving the proficiency of the player in evacuating from the current virtual battle mission, and indirectly improving the efficiency of human-computer interaction.

In step 1033, when the vehicle is in the waiting-to-leave state, in response to the vehicle-entering behavior of the virtual object facing the vehicle in the virtual scene, it is determined that the virtual object has completed evacuation from the target area. Herein, the vehicle-entering behavior is the evacuation behavior.

Here, when the vehicle arrives at the target area, a climbing tool will be displayed on the game screen, and the climbing tool can assist the virtual object to climb on the vehicle. When the virtual object faces the climbing tool, an "Enter Vehicle" button will be displayed in the game interface, and the player can trigger this "Enter Vehicle" button to enter the vehicle.

As an example, in step 1033, after the vehicle in the virtual scene arrives at the target area, the prompt information of the current carrying capacity of the vehicle is also displayed on the control interface. The prompt information of the current carrying capacity is for prompting the number of people that the vehicle can accommodate in the current virtual battle mission, that is, for prompting the maximum evacuation number that the vehicle can accommodate. Here, the current carrying capacity changes with the number of people carried by the vehicle. When one virtual object is carried in the vehicle, the current carrying capacity will be reduced by one correspondingly.

In this way, according to the prompt information of the current carrying capacity, the player can judge whether to arrive at the target area to evacuate, which can reduce the moving time of the virtual object in the virtual scene and further improve the efficiency of human-computer interaction.

For example, the prompt information of the current carrying capacity of the vehicle may be displayed on the control interface, and the prompt information of the current carrying capacity may be the seat marks corresponding to all virtual objects that can be carried by the vehicle displayed on the control interface, and the number of seat marks is consistent with the number of virtual objects. For example, a colored seat mark may refer to a seat occupied by a virtual object carried by the vehicle, and a colorless seat mark may refer to an empty seat with which the vehicle can carry a virtual object.

Figure 4:
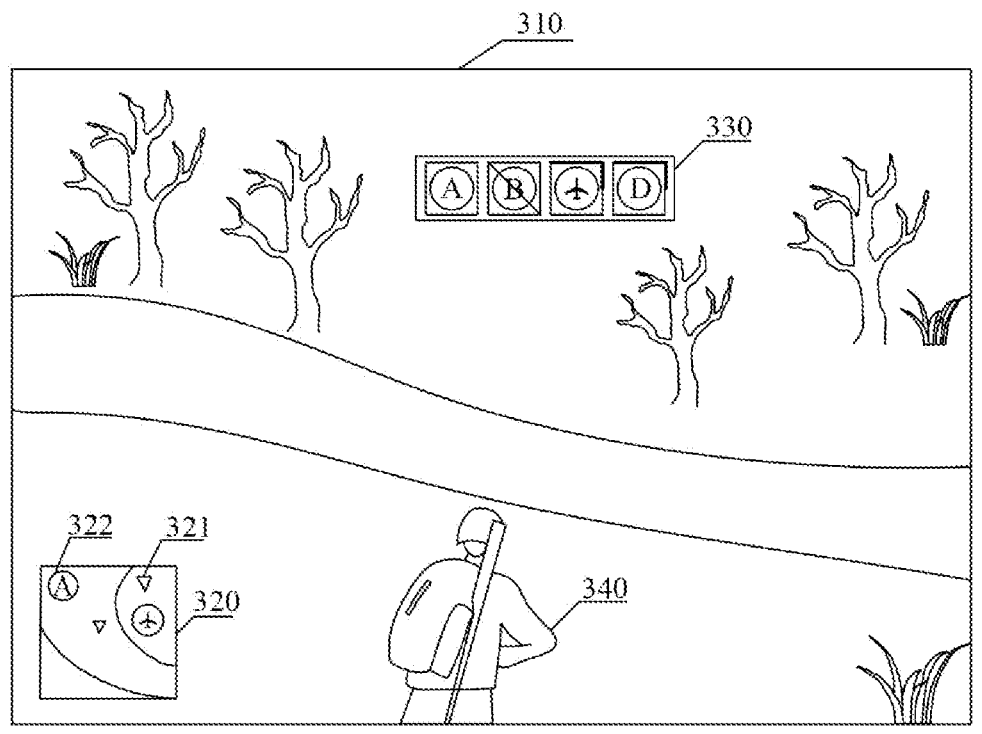
FIG. 4 is a schematic diagram of a game interface provided by an embodiment of the present disclosure.

For example, please refer to FIG. 4, which is a second schematic diagram of a game interface provided by an embodiment of the present disclosure. As shown in FIG. 4, after the target area is generated, the virtual object 340 in the current virtual battle mission will move to the target area C, and then in the scene map control 320, the object mark 321 will approach the position mark 322 of the target area C. At the same time, the current area state information of the target areas A, B, C and D displayed in the area mark control 330 will also change. As shown in the area mark control 330 in FIG. 4, the current area state information of the target area A is the starting-to-leave state, the current area state information of the target area B is the destroyed state, and the current area state information of the target area C is the waiting-to-leave state (vehicle waiting state here), and the current area state information of the target area D is the ready-to-leave state (calling vehicle state here). By displaying different state information of different target areas, the player can choose the target area suitable for himself to evacuate.

Figure 5:
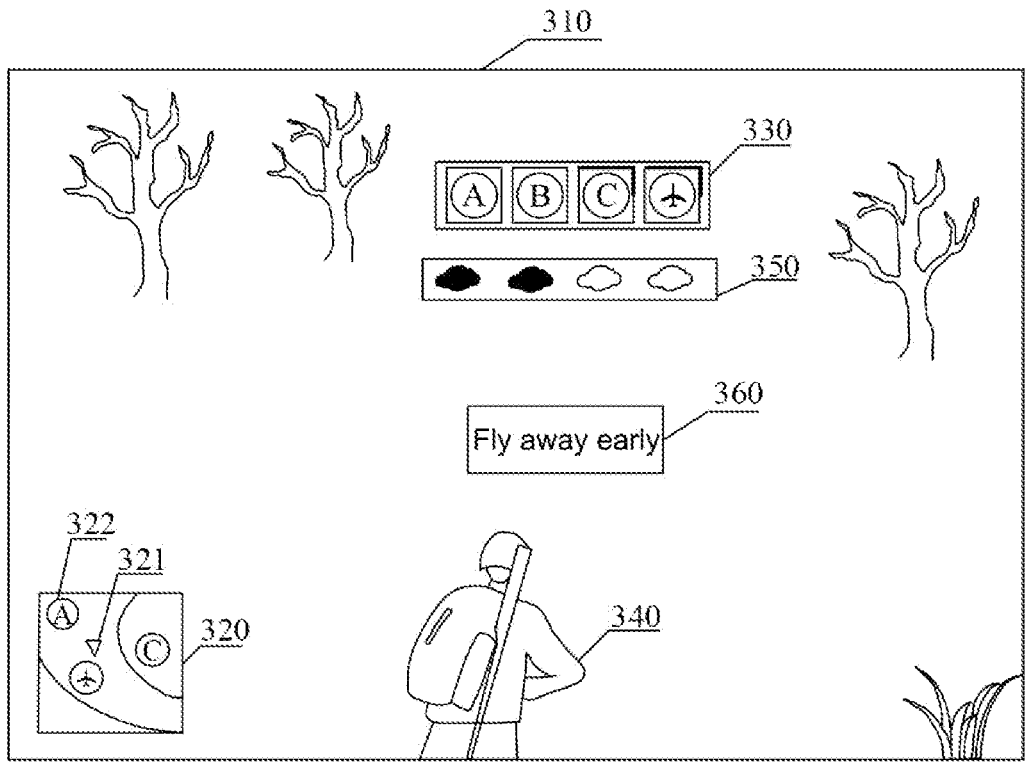
FIG. 5 is a schematic diagram of a game interface provided by an embodiment of the present disclosure.

For example, please refer to FIG. 5, which is a third schematic diagram of a game interface provided by an embodiment of the present disclosure. As shown in FIG. 5, the virtual object 340 surviving in the current virtual battle mission moves to the target area D. Further, in the scene map control 320, the object mark 321 will approach the position mark 322 of the target area D. At the same time, the current area state information of the target area D displayed in the area mark control 330 is the waiting-to-leave state (the vehicle waiting state here). At this time, the virtual object 340 is in the target area D, the prompt information 350 of the current carrying capacity is displayed on the control interface, and the seat marks corresponding to all virtual objects that can be carried are displayed in the prompt information 350 of the current carrying capacity. The black seat mark may refer to the seat occupied by the virtual object carried by the vehicle; here it indicates that there are two virtual objects carried by the vehicle. The white seat mark may refer to the empty seat that the vehicle can use to further carry the virtual object; here it indicates that the number of target player characters who can be further carried by the vehicle is two.

In the embodiment of the present disclosure, after it is determined that the virtual object has completed evacuation from the target area, the current area state information of the target area is adjusted to a cool-down state, and the display parameter of the area mark control is adjusted according to the cool-down state.

Here, after the virtual object has completed evacuation from the target area, the cool-down state mark is displayed on the control interface to remind other players that evacuation has just been performed in the target area, which will cause the target area to be cooled down for a period of time. During this cool-down duration, other players cannot evacuate from this target area, thus ensuring the game balance and further improving the game performance. For example, during the cool-down duration, the player cannot call the vehicle for evacuation again. When the cool-down duration ends, the vehicle can be called again in the evacuation area, and the behavior of calling the vehicle needs to be triggered by the player.

In addition, after the virtual object is evacuated from the target area, in addition to displaying the cool-down state mark on the control interface, the animation of the vehicle flying away may be played on the game screen to inform the player in a more vivid way that the evacuation is successful. Here, the animation display mode of the vehicle flying away can make the player's feeling of evacuation more real and improve the game quality.

In some examples, after the current area state information of the target area is adjusted to the cool-down state, in response to the condition that the cool-down duration corresponding to the cool-down state ends, the current area state information is continuously adjusted to the waiting-to-leave state, and the display parameter of the area mark control is adjusted according to the waiting-to-leave state.

Here, when the cool-down duration of the target area ends, and before the target area is destroyed, the virtual object can continue to get to the target area to evacuate, so as to achieve the effect of evacuating the current virtual battle mission as soon as possible, thus improving the evacuation efficiency of the player and speeding up the game progress.

In related games, the target area for the evacuation of the virtual object will be affected by the first area. When the first area expands gradually with time, it will cover the target area. Because the first area is an area determined according to an area restriction and shrinkage rule for restricting the virtual object from executing the virtual battle mission, the target area covered by the first area cannot be provided for the virtual object to evacuate. In this case, the target area may be destroyed.

In a specific embodiment, step S103 further includes: in response to the target area in the virtual scene being in a first area, obtaining the current area state information of the target area in the first area, adjusting the current area state information of the target area in the first area to a destroyed state, and adjusting the display parameter of the area mark control according to the destroyed state, where the first area is an area determined according to an area restriction and shrinkage rule for restricting the virtual object from executing the virtual battle mission.

In this step, with the expansion of the first area, the target area covered by the first area gradually increases, that is, there are fewer and fewer target areas for the virtual object to evacuate. In this way, the virtual object in the current virtual battle mission needs to arrive at the target area to evacuate while avoiding the first area, which limits the range of activities of the virtual object in the virtual scene, thus avoiding the problem of long time consumption caused by moving a long distance by the virtual object in the virtual scene, indirectly improving the efficiency of human-computer interaction, and speeding up the game progress.

In an embodiment, after the current area state information of the target area in the first area is adjusted to the destroyed state, the destroyed target area is regenerated in the non-first area of the virtual scene, and a prompt message for prompting the virtual object that the target area is regenerated in the virtual scene is sent.

Since the target area in the first area is in a destroyed state and cannot be used for the virtual objects to evacuate, in the embodiment of the present disclosure, the destroyed target area can be regenerated in the non-first area of the virtual scene, so that the number of target areas for the virtual objects to evacuate is basically not reduced, but the number of virtual objects in this virtual battle is gradually decreasing, which can ensure that fewer virtual objects share more evacuation resources. In this way, because a plurality of target areas can be used for the virtual objects to evacuate synchronously, the evacuation time of virtual objects in the current virtual battle mission is greatly reduced, thus improving the evacuation efficiency of the player, and speeding up the game progress.

Here, the destroyed target area is randomly regenerated in the non-first area of the virtual scene.

The prompt message for prompting the virtual objects that the target area is regenerated in the virtual scene may be notified globally, so that all the surviving virtual objects in the current virtual battle mission can receive the prompt message, which is helpful for the surviving virtual objects to evacuate as soon as possible and improve the evacuation efficiency.

In another embodiment, after the current area state information of the target area in the first area is adjusted to the destroyed state, the destroyed target area in the current virtual battle mission will not be regenerated.

Here, the number of generated target areas in the current virtual battle mission is fixed, and target areas will not be regenerated because the target area in the first area is destroyed. In this way, the game performance can be improved because there is no need to consume computer resources to regenerate the destroyed target area.

In step S104, in response to the evacuation behavior of the virtual object in the target area, it is determined that the virtual object has completed evacuation from the target area.

In the embodiment of the present disclosure, the evacuation behavior is for controlling the virtual object to evacuate from the target area, in response to the evacuation instruction for evacuation operation sent by the player to the terminal. As an example, the evacuation operation may be a click operation on an icon, a button or a block diagram indicating the evacuation function on the game interface, or a drag operation on the evacuation function control executed on the game interface.

The evacuation behavior may be a behavior that the time that the virtual object stays in the target area meets the preset time requirement, a behavior that the virtual object boards the vehicle in the target area, or a behavior that the virtual object opens the evacuation door in the target area, etc. Here, the presentation form of the evacuation behavior of the virtual object in the target area is not specifically limited.

In some examples according to the present disclosure, the evacuation condition that the virtual object satisfies in the target scene includes at least one of that:

(1) The number of virtual objects performing the evacuation behavior in the target area reaches a preset number.

Here, when the number of objects carried by the vehicle reaches a preset number, that is, when the vehicle can no longer carry any other virtual objects, the server controls the vehicle to evacuate from the target area, so that the virtual objects carried by the vehicle can complete the evacuation of the current virtual battle mission.

For example, as shown in FIG. 5, in the case that the prompt information 350 of the current carrying capacity indicates that the number of objects that can be carried by the vehicle is 4, when the number of virtual objects carried by the vehicle reaches 4, the server can control the vehicle to evacuate from the target area.

(2) The virtual object in the target area has an early evacuation behavior.

Here, the server controls the vehicle to fly away from the target area in response to the early fly-away behavior of any virtual object, so that the virtual object can complete the evacuation.

The early fly-away behavior may occur at any time when a virtual object is carried by a vehicle. The early fly-away behavior is configured for indicating that the server receives the early fly-away instruction obtained by the terminal in response to the early fly-away operation sent by the player to the terminal, so as to control the virtual object to fly away early from the target area. As an example, the early fly-away operation may be a click operation on an icon, a button or a block diagram indicating the early fly-away function on the game interface, or a drag operation executed on the game interface for the early fly-away function control.

As shown in FIG. 5, the fly-away function control "early fly-away" 350 may be set in the center of the game interface, which is convenient for the player to review, and timely reminds the player that he can perform early fly-away behavior when he meets the enemy.

(3) The current area state information of the target area is adjusted to the destroyed state.

The target area is covered by a "poison circle", because the virtual object will be eliminated directly in the first area, when the target area is covered by the first area, the virtual object cannot enter the target area, and the target area is useless, so that the evacuation needs to be performed before the target area is destroyed.

The above three evacuation conditions are to ensure that the player can evacuate from the target area as soon as possible after arriving at the target area, so that the game time of a single virtual battle mission will not be too long, thus reducing the waste of terminal processing resources and power resources.

In order to ensure the integrity of the game, the embodiment of the present disclosure further includes: when the current virtual battle mission meets a preset settlement condition, triggering and entering a settlement phase of the current virtual battle mission.

The preset settlement condition includes any one of the following:

The virtual object in the current virtual battle mission has completed the evacuation from the target area.

Here, after each virtual object is evacuated from the target area, the settlement for the player corresponding to the current virtual object in the current virtual battle mission will be made.

(2) All virtual objects that have not been eliminated in the current virtual battle mission have completed the evacuation from the target area.

Here, after all the virtual objects that have not been eliminated in the current virtual battle mission have completed the evacuation from the target area, the settlement for the player corresponding to the evacuated virtual objects will be made.

The settlement phase refers to the phase that the player's performance in the current virtual battle mission is evaluated after the end of the current virtual battle mission, and the evaluation may be manifested in the form of obtained gold coins and accumulated experience values, etc. Furthermore, after the above preset settlement condition are met, the current virtual battle mission may end.

According to the information processing method in a game provided by the embodiments of the present disclosure, the player can still grasp the current area state information of the target area without arriving at the target area for evacuation, and the player can determine the target area for evacuation more quickly by combining the position mark displayed in real time in the scene map and the current area state information of the target area displayed in the control interface, which is helpful for the player to arrive at the target area for evacuation quickly and complete the evacuation in time, thus reducing the time consumption for the player to search the target area for evacuation during the game, speeding up the game progress, improving the efficiency of human-computer interaction, making the game time of a single virtual battle mission not too long, and reducing the waste of terminal processing resources and power resources.

Based on the same inventive concept, the embodiments of the present disclosure further provide an apparatus corresponding to the information processing method in a game. Since the principle of the apparatus to solve the problem in the embodiment of the present disclosure is similar to that of the above method in the embodiments of the present disclosure, for the example of the apparatus, reference may be made to that of the method, which will not be repeated here.

Figures 6, 7:
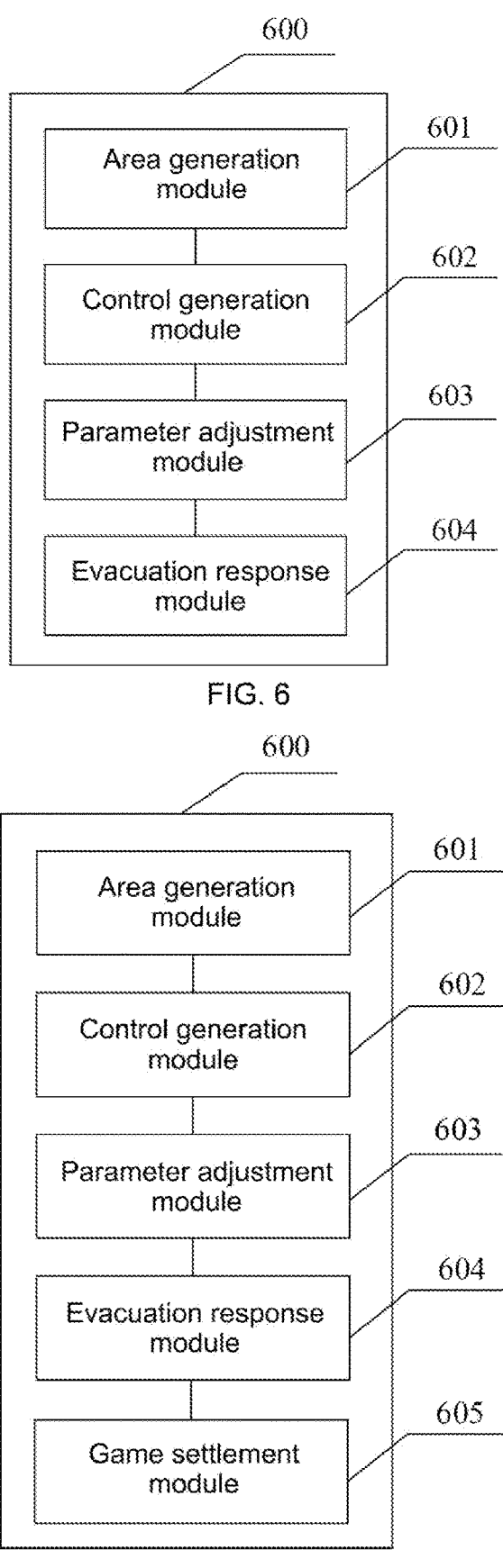
FIG. 6 is a structural schematic diagram of an information processing apparatus in a game provided by an embodiment of the present disclosure.
FIG. 7 is a structural schematic diagram of an information processing apparatus in a game provided by an embodiment of the present disclosure.

Please refer to FIG. 6, which is a structural schematic diagram of an information processing apparatus in a game provided by an embodiment of the present disclosure. As shown in FIG. 6, an embodiment of the present disclosure provides an information processing apparatus in a game, where a game interface is provided through a terminal, the game interface includes a game screen and a control interface, the game screen includes a virtual scene of a current virtual battle mission, and the control interface includes a scene map control. The apparatus 600 includes:

an area generation module 601, configured for in response to the current virtual battle mission meeting a preset condition, controlling generation of at least one target area in the virtual scene;

a control generation module 602, configured for generating at least one corresponding position mark in a position corresponding to the orientation information, in the scene map corresponding to the scene map control, according to orientation information of the at least one target area in the virtual scene, and generating at least one area mark control corresponding to the at least one target area in the control interface;

a parameter adjustment module 603, configured for in response to an activation behavior of a virtual object in the target area, obtaining current area state information of the target area, and adjusting a display parameter of the area mark control according to the current area state information to indicate the current area state information; and an evacuation response module 604, configured for in response to an evacuation behavior of the virtual object in the target area, determining that the virtual object has completed evacuation from the target area.

Here, the target area for evacuation can be determined more quickly by combining the position mark displayed in real time in the scene map and the current area state information of the target area displayed in the control interface, which is helpful for the player to arrive at the target area for evacuation quickly and complete the evacuation in time, thus reducing the time consumption for the player to search the target area for evacuation during the game, speeding up the game progress, improving the efficiency of human-computer interaction, making the game time of a single virtual battle mission not too long, and reducing the waste of terminal processing resources and power resources.

In an optional embodiment of the present disclosure, the apparatus 600 further includes an information synchronization module (not shown in the figure), which is configured for synchronizing the current area state information of the target area to all surviving virtual objects in the virtual battle mission.

Here, the current area state information of the target area in the whole virtual battle is synchronized, thus reducing the time consumption for the player to search the target area for evacuation during the game, speeding up the game progress, improving the efficiency of human-computer interaction, making the game time of a single virtual battle mission not too long.

In an optional embodiment of the present disclosure, the apparatus 600 further includes an information sending module (not shown in the figure), which is configured for sending the current area state information indicated by the display parameter of the adjusted area mark control to the game interface of at least one other virtual object, where the at least one other virtual object belongs to a same camp as the virtual object.

Here, it is helpful for the player who has arrived at the target area first and his teammates to evacuate from the target area as soon as possible, which reduces the time consumption for teammates to search for the target area for evacuation during the game, speeds up the game progress to a certain extent, and improves the efficiency of human-computer interaction.

In an optional embodiment of the present disclosure, the preset condition includes at least one of that:

A game progress of the current virtual battle mission reaches a preset time point;

here, it can avoid the situation that the player misses the evacuation opportunity because he doesn't know the generation time of the target area, speed up the game progress, and improve the efficiency of human-computer interaction.

The virtual object in the current virtual battle mission arrives at a designated position, where the designated position is a generation position of any target area in the virtual scene or a preset trigger position in the virtual scene for triggering the generation of any target area;

here, the player can enter the target area to evacuate without waiting for the target area to be generated, which saves time, reduces the interaction operation between the player and the terminal for arriving at the target area, improves the interaction efficiency, and speeds up the game progress. Meanwhile, there is no need to set the program code for the preset time point in the computer, and the computer resources can be reduced to improve the game performance.

The number of surviving virtual objects in the current virtual battle mission reaches a preset number;

a ratio of a first area in the virtual scene to the whole virtual scene reaches a preset numerical value, where the first area is an area determined according to an area restriction and shrinkage rule for restricting the virtual object from executing the virtual battle mission.

Here, all the virtual objects in the current virtual battle mission always move towards some common areas, compete for resources and fight in this area, which helps to advance the game progress, so that the game time of a single virtual battle mission will not be too long, and the waste of terminal processing resources and power resources will be reduced.

In an optional embodiment of the present disclosure, the current area state information includes any one of the following:

a starting-to-leave state, a ready-to-leave state, a waiting-to-leave state, a cool-down state, or a destroyed state.

Here, a variety of different current area state information of the target area is helpful for the player to select the appropriate target area for evacuation according to the different current area state information, thus indirectly improving the efficiency of human-computer interaction and speeding up the game progress.

In an optional embodiment of the present disclosure, the apparatus 600 further includes an information prompting module (not shown in the figure), which is configured for displaying activation prompt information in the control interface in response to the virtual object entering the inactivated target area.

After displaying the activation prompt information, the parameter adjustment module 603 is specifically configured for: in response to the activation behavior of the virtual object in the target area, obtaining the current area state information of the activated target area, adjusting the current area state information of the activated target area to a starting-to-leave state, and determining the display parameter of the area mark control according to the starting-to-leave state.

Here, the player is reminded to activate the target area through the activation prompt information, so that the player can activate the target area in time, and avoid delaying the evacuation of the virtual object in the virtual battle mission from the activated target area, thus helping to advance the game progress, and improving the efficiency of human-computer interaction.

In an optional embodiment of the present disclosure, the parameter adjustment module 603 is further specifically configured for: in response to the target area in the virtual scene being in a first area, obtaining the current area state information of the target area in the first area, adjusting the current area state information of the target area in the first area to a destroyed state, and adjusting the display parameter of the area mark control according to the destroyed state, where the first area is an area for restricting the virtual object from executing the virtual battle mission determined according to an area restriction and shrinkage rule.

Here, the range of activities of the virtual object in the virtual scene is limited, thus avoiding the problem of long time consumption caused by moving a long distance by the virtual object in the virtual scene, indirectly improving the efficiency of human-computer interaction, and speeding up the game progress.

In an optional embodiment of the present disclosure, the apparatus 600 further includes a prompt generation module (not shown in the figure), and the prompt generation module is configured for: after adjusting the current area state information of the target area in the first area to the destroyed state, regenerating the destroyed target area in a non-first area of the virtual scene, and sending a prompt message for prompting the virtual object that the target area is regenerated in the virtual scene.

Here, because a plurality of target areas can be used for the virtual objects to evacuate synchronously, the evacuation time of virtual objects in the current virtual battle mission is greatly reduced, thus improving the evacuation efficiency of the player, and speeding up the game progress.

In an optional embodiment of the present disclosure, the parameter adjustment module 603 is further specifically configured for: in response to a ready-to-leave behavior of the virtual object in the target area, obtaining the current area state information of the target area, adjusting the current area state information of the target area to a ready-to-leave state, and adjusting the display parameter of the area mark control according to the ready-to-leave state.

In an optional embodiment of the present disclosure, the parameter adjustment module 603 is further specifically configured for: in response to a vehicle in the virtual scene being in the target area, obtaining the current area state information of the target area where the vehicle is located, adjusting the current area state information of the target area where the vehicle is located to a waiting-to-leave state, and adjusting the display parameter of the area mark control according to the waiting-to-leave state, where the vehicle is configured for carrying the virtual object to assist the virtual object to evacuate from the target area.

Here, the current area state information may be indicated as the waiting-to-leave state by the fact that the vehicle exists in the target area, so that the player can easily grasp the current area state information, thus improving the proficiency of the player in evacuating from the current virtual battle mission, and indirectly improving the efficiency of human-computer interaction.

In an optional embodiment of the present disclosure, the apparatus 600 further includes a capacity control generation module (not shown in the figure), which is configured for generating a vehicle carrying capacity control in the control interface, after the current area state information of the target area where the vehicle is located is adjusted to the waiting-to-leave state.

The evacuation response module 604 is specifically configured for: in response to the evacuation behavior of the virtual object in the target area, reducing a current carrying capacity of the vehicle, and adjusting the display parameter of the vehicle carrying capacity control according to the current carrying capacity of the vehicle to indicate the current carrying capacity of the vehicle; and in response to an evacuation condition that the virtual object satisfies in the target scene, determining that the virtual object has completed evacuation from the target area.

Here, according to the prompt information of the current carrying capacity, the player can judge whether to arrive at the target area to evacuate, which can reduce the moving time of the virtual object in the virtual scene and further improve the efficiency of human-computer interaction.

In an optional embodiment of the present disclosure, the evacuation condition that the virtual object satisfies in the target scene includes at least one of that:

the number of virtual objects performing the evacuation behavior in the target area reaches a preset number;

the virtual object in the target area has an early evacuation behavior; and the current area state information of the target area is adjusted to the destroyed state.

Here, the above three evacuation conditions are to ensure that the player can evacuate from the target area as soon as possible after arriving at the target area, so that the game time of a single virtual battle mission will not be too long, thus reducing the waste of terminal processing resources and power resources.

In an optional embodiment of the present disclosure, the parameter adjustment module 603 is specifically configured for: after determining that the virtual object has completed the evacuation from the target area, adjusting the current area state information of the target area to a cool-down state, and adjusting the display parameter of the area mark control according to the cool-down state.

Here, the game balance is guaranteed, and the game performance is improved.

In an optional embodiment of the present disclosure, the parameter adjustment module 603 is specifically configured for: after adjusting the current area state information of the target area to the cool-down state, in response to a condition that a cool-down duration corresponding to the cool-down state ends, adjusting the current area state information to the waiting-to-leave state, and adjusting the display parameter of the area mark control according to the waiting-to-leave state.

Here, when the cool-down duration of the target area ends, and before the target area is destroyed, the virtual object can continue to evacuate by arriving at the target area, so as to achieve the effect of evacuating the current virtual battle mission as soon as possible, thus improving the evacuation efficiency of the player and speeding up the game progress.

Please refer to FIG. 7. In an optional embodiment of the present disclosure, the apparatus 600 further includes a game settlement module 605, and the game settlement module 605 is configured for: when the current virtual battle mission meets a preset settlement condition, triggering and entering a settlement phase of the current virtual battle mission, where the preset settlement condition includes any one of that:

the virtual object in the current virtual battle mission has completed the evacuation from the target area; and all virtual objects that have not been eliminated in the current virtual battle mission have completed the evacuation from the target area.

Here, the integrity of the game is guaranteed.

Figure 8:
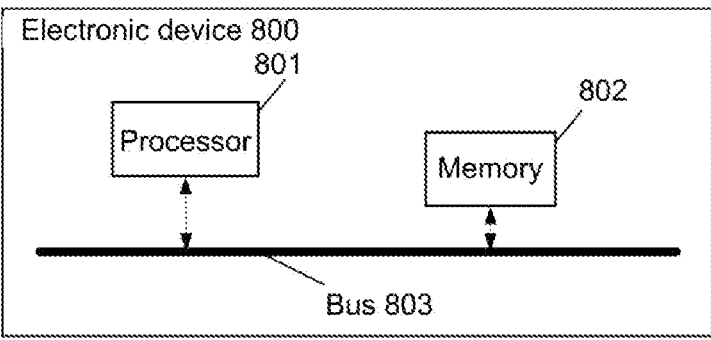
FIG. 8 is a structural schematic diagram of an electronic device provided by an embodiment of the present disclosure.

Please refer to FIG. 8, which is a structural schematic diagram of an electronic device provided by an embodiment of the present disclosure. As shown in FIG. 8, the electronic device 800 includes a processor 801, a memory 802 and a bus 803.

The memory 802 stores machine-readable instructions executable by the processor 801. When the electronic device 800 is running, the processor 801 communicates with the memory 802 through the bus 803, so that the processor 801, when running, executes the instructions of:

in response to the current virtual battle mission meeting a preset condition, controlling generation of at least one target area in the virtual scene;

according to orientation information of the at least one target area in the virtual scene, generating at least one corresponding position mark in a position corresponding to the orientation information in the scene map corresponding to the scene map control, and generating at least one area mark control corresponding to the at least one target area in the control interface;

in response to an activation behavior of a virtual object in the target area, obtaining current area state information of the target area, and adjusting a display parameter of the area mark control according to the current area state information to indicate the current area state information; and in response to an evacuation behavior of the virtual object in the target area, determining that the virtual object has completed evacuation from the target area.

Here, the target area for evacuation can be determined more quickly by combining the position mark displayed in real time in the scene map and the current area state information of the target area displayed in the control interface, which is helpful for the player to arrive at the target area for evacuation quickly and complete the evacuation in time, thus reducing the time consumption for the player to search the target area for evacuation during the game, speeding up the game progress, improving the efficiency of human-computer interaction, making the game time of a single virtual battle mission not too long, and reducing the waste of terminal processing resources and power resources.

In an optional embodiment, the method of the instructions executed by the processor 801 further includes:

synchronizing the current area state information of the target area to all surviving virtual objects in the virtual battle mission.

Here, the current area state information of the target area in the whole virtual battle is synchronized, thus reducing the time consumption for the player to search the target area for evacuation during the game, speeding up the game progress, improving the efficiency of human-computer interaction, making the game time of a single virtual battle mission not too long.

In an optional embodiment, the method of instructions executed by the processor 801 further includes:

sending the current area state information indicated by the display parameter of the adjusted area mark control to the game interface of at least one other virtual object, where the at least one other virtual object belongs to a same camp as the virtual object.

Here, it is helpful for the player who has arrived at the target area first and his teammates to evacuate from the target area as soon as possible, which reduces the time consumption for teammates to search for the target area for evacuation during the game, speeds up the game progress to a certain extent, and improves the efficiency of human-computer interaction.

In an optional embodiment, the preset condition includes at least one of that:

a game progress of the current virtual battle mission reaches a preset time point, here, it can avoid the situation that the player misses the evacuation opportunity because he doesn't know the generation time of the target area, speed up the game progress, and improve the efficiency of human-computer interaction;

the virtual object in the current virtual battle mission arrives at a designated position, where the designated position is a generation position of any target area in the virtual scene or a preset trigger position in the virtual scene for triggering the generation of any target area, here, the player can enter the target area to evacuate without waiting for the target area to be generated, which saves time, reduces the interaction operation between the player and the terminal for arriving at the target area, improves the interaction efficiency, and speeds up the game progress. At the same time, there is no need to set the program code for the preset time point in the computer, and the computer resources can be reduced to improve the game performance;

the number of surviving virtual objects in the current virtual battle mission reaches a preset number; or a ratio of a first area in the virtual scene to the whole virtual scene reaches a preset numerical value, where the first area is an area determined according to an area restriction and shrinkage rule for restricting the virtual object from executing the virtual battle mission.

Here, all the virtual objects in the current virtual battle mission always move towards some common areas, compete for resources and fight in this area, which helps advance the game progress, so that the game time of a single virtual battle mission will not be too long, and the waste of terminal processing resources and power resources will be reduced.

In an optional embodiment, the current area state information includes any one of the following items:

a starting-to-leave state, a ready-to-leave state, a waiting-to-leave state, a cool-down state, or a destroyed state.

Here, a variety of different current area state information of the target area is helpful for the player to select the appropriate target area for evacuation according to the different current area state information, thus improving indirectly the efficiency of human-computer interaction and speeding up the game progress.

In an optional embodiment, the method of the instructions executed by the processor 801 further includes:

in response to the virtual object entering the inactivated target area, displaying activation prompt information in the control interface, where the in response to an activation behavior of a virtual object in the target area, obtaining current area state information of the target area and adjusting a display parameter of the area mark control according to the current area state information includes:

after displaying the activation prompt information, in response to the activation behavior of the virtual object in the target area, obtaining the current area state information of the activated target area, adjusting the current area state information of the activated target area to a starting-to-leave state, and adjusting the display parameter of the area mark control according to the starting-to-leave state.

Here, the player is reminded to activate the target area through the activation prompt information, so that the player can activate the target area in time, and avoid delaying the evacuation of the virtual object in the virtual battle mission from the activated target area, thus helping to advance the game progress, and improving the efficiency of human-computer interaction.

In an optional embodiment, in the method of the instruction executed by the processor 801, the obtaining current area state information of the target area and adjusting a display parameter of the area mark control according to the current area state information further includes:

in response to the target area in the virtual scene being in a first area, obtaining the current area state information of the target area in the first area, adjusting the current area state information of the target area in the first area to a destroyed state, and adjusting the display parameter of the area mark control according to the destroyed state, where the first area is an area determined according to an area restriction and shrinkage rule for restricting the virtual object from executing the virtual battle mission.

Here, the range of activities of the virtual object in the virtual scene is limited, thus avoiding the problem of long time consumption caused by moving a long distance by the virtual object in the virtual scene, indirectly improving the efficiency of human-computer interaction, and speeding up the game progress.

In an optional embodiment, the method of the instructions executed by the processor 801 further includes:

after adjusting the current area state information of the target area in the first area to the destroyed state, regenerating the destroyed target area in a non-first area of the virtual scene, and sending a prompt message for prompting the virtual object that the target area is regenerated in the virtual scene.

Here, because a plurality of target areas can be used for the virtual objects to evacuate synchronously, the evacuation time of virtual objects in the current virtual battle mission is greatly reduced, thus improving the evacuation efficiency of the player, and speeding up the game progress.

In an optional embodiment, in the method of the instruction executed by the processor 801, the obtaining current area state information of the target area and adjusting a display parameter of the area mark control according to the current area state information further includes:

in response to a ready-to-leave behavior of the virtual object in the target area, obtaining the current area state information of the target area, adjusting the current area state information of the target area to a ready-to-leave state, and adjusting the display parameter of the area mark control according to the ready-to-leave state.

In an optional embodiment, in the method of the instruction executed by the processor 801, the obtaining current area state information of the target area and adjusting a display parameter of the area mark control according to the current area state information includes:

in response to a vehicle in the virtual scene being in the target area, obtaining the current area state information of the target area where the vehicle is located, adjusting the current area state information of the target area where the vehicle is located to a waiting-to-leave state, and adjusting the display parameter of the area mark control according to the waiting-to-leave state, where the vehicle is configured for carrying the virtual object to assist the virtual object to evacuate from the target area.

Here, the current area state information may be indicated as the waiting-to-leave state by the vehicle existing in the target area, so that the player can easily grasp the current area state information, thus improving the proficiency of the player in evacuating from the current virtual battle mission, and indirectly improving the efficiency of human-computer interaction.

In an optional embodiment, the method of the instructions executed by the processor 801 further includes:

generating a vehicle carrying capacity control in the control interface after adjusting the current area state information of the target area where the vehicle is located to the waiting-to-leave state; and the in response to an evacuation behavior of the virtual object in the target area determining that the virtual object has completed evacuation from the target area includes:

in response to the evacuation behavior of the virtual object in the target area, reducing a current carrying capacity of the vehicle, and adjusting the display parameter of the vehicle carrying capacity control according to the current carrying capacity of the vehicle to indicate the current carrying capacity of the vehicle; and in response to an evacuation condition that the virtual object satisfies in the target scene, determining that the virtual object has completed evacuation from the target area.

Here, according to the prompt information of the current carrying capacity, the player can judge whether to arrive at the target area to evacuate, which can reduce the moving time of the virtual object in the virtual scene and further improve the efficiency of human-computer interaction.

In an optional embodiment, the evacuation condition that the virtual object satisfies in the target scene includes at least one of that:

the number of virtual objects performing the evacuation behavior in the target area reaches a preset number;

the virtual object in the target area has an early evacuation behavior; and the current area state information of the target area is adjusted to the destroyed state.

Here, the above three evacuation conditions are to ensure that the player can evacuate from the target area as soon as possible after arriving at the target area, so that the game time of a single virtual battle mission will not be too long, thus reducing the waste of terminal processing resources and power resources.

In an optional embodiment, the method of the instructions executed by the processor 801 further includes:

after determining that the virtual object has completed the evacuation from the target area, adjusting the current area state information of the target area to a cool-down state, and adjusting the display parameter of the area mark control according to the cool-down state.

Here, the game balance is guaranteed, and the game performance is improved.

In an optional embodiment, the method of the instructions executed by the processor 801 further includes:

after adjusting the current area state information of the target area to the cool-down state, in response to a condition that a cool-down duration corresponding to the cool-down state ends, adjusting the current area state information to the waiting-to-leave state, and adjusting the display parameter of the area mark control according to the waiting-to-leave state.

Here, when the cool-down duration of the target area ends, and before the target area is destroyed, the virtual object can continue to evacuate by arriving at the target area, so as to achieve the effect of evacuating the current virtual battle mission as soon as possible, thus improving the evacuation efficiency of the player and speeding up the game progress.

In an optional embodiment, the method of the instructions executed by the processor 801 further includes:

when the current virtual battle mission meets a preset settlement condition, triggering and entering a settlement phase of the current virtual battle mission, where the preset settlement condition includes any one of that:

the virtual object in the current virtual battle mission has completed the evacuation from the target area; and all virtual objects that have not been eliminated in the current virtual battle mission have completed the evacuation from the target area.

Here, the integrity of the game is guaranteed.

An embodiment of the present disclosure further provides a computer-readable storage medium, where a computer program is stored on the computer-readable storage medium, and the computer program, when run by a processor, execute the following commands:

in response to the current virtual battle mission meeting a preset condition, controlling generation of at least one target area in the virtual scene;

according to orientation information of the at least one target area in the virtual scene, generating at least one corresponding position mark, in a position corresponding to the orientation information in the scene map corresponding to the scene map control, and generating at least one area mark control corresponding to the at least one target area in the control interface;

in response to an activation behavior of a virtual object in the target area, obtaining current area state information of the target area, and adjusting a display parameter of the area mark control according to the current area state information to indicate the current area state information; and in response to an evacuation behavior of the virtual object in the target area, determining that the virtual object has completed evacuation from the target area.

Here, the target area for evacuation can be determined more quickly by combining the position mark displayed in real time in the scene map and the current area state information of the target area displayed in the control interface, which is helpful for the player to arrive at the target area for evacuation quickly and complete the evacuation in time, thus reducing the time consumption for the player to search for the target area for evacuation during the game, speeding up the game progress, improving the efficiency of human-computer interaction, making the game time of a single virtual battle mission not too long, and reducing the waste of terminal processing resources and power resources.

In an optional embodiment, the method of the instructions executed by the computer-readable storage medium further includes:

synchronizing the current area state information of the target area to all surviving virtual objects in the virtual battle mission.

Here, the current area state information of the target area in the whole virtual battle is synchronized, thus reducing the time consumption for the player to search for the target area for evacuation during the game, speeding up the game progress, improving the efficiency of human-computer interaction, making the game time of a single virtual battle mission not too long.

In an optional embodiment, the method of the instructions executed by the computer-readable storage medium further includes:

sending the current area state information indicated by the display parameter of the adjusted area mark control to the game interface of at least one other virtual object, where the at least one other virtual object belongs to a same camp as the virtual object.

Here, it is helpful for the player who has arrived at the target area first and his teammates to evacuate from the target area as soon as possible, which reduces the time consumption for teammates to search for the target area for evacuation during the game, speeds up the game progress to a certain extent, and improves the efficiency of human-computer interaction.

In an optional embodiment, the preset condition includes at least one of that:

a game progress of the current virtual battle mission reaches a preset time point, here, it can avoid the situation that the player misses the evacuation opportunity because he doesn't know the generation time of the target area, speed up the game progress, and improve the efficiency of human-computer interaction;

the virtual object in the current virtual battle mission arrives at a designated position, where the designated position is a generation position of any target area in the virtual scene or a preset trigger position in the virtual scene for triggering the generation of any target area;

here, the player can enter the target area to evacuate without waiting for the target area to be generated, which saves time, reduces the interaction operation between the player and the terminal for arriving at the target area, improves the interaction efficiency, and speeds up the game progress. At the same time, there is no need to set the program code for the preset time point in the computer, and the computer resources can be reduced to improve the game performance;

the number of surviving virtual objects in the current virtual battle mission reaches a preset number; or a ratio of a first area in the virtual scene to the whole virtual scene reaches a preset numerical value, where the first area is an area determined according to an area restriction and shrinkage rule for restricting the virtual object from executing the virtual battle mission.

Here, all the virtual objects in the current virtual battle mission always move towards some common areas, compete for resources and fight in this area, which helps advance the game progress, so that the game time of a single virtual battle mission will not be too long, and the waste of terminal processing resources and power resources will be reduced.

In an optional embodiment, the current area state information includes any one of the following:

A starting-to-leave state, a ready-to-leave state, a waiting-to-leave state, a cool-down state, or a destroyed state.

Here, a variety of different current area state information of the target area is helpful for the player to select the appropriate target area for evacuation according to the different current area state information, thus indirectly improving the efficiency of human-computer interaction and speeding up the game progress.

In an optional embodiment, the method of the instructions executed by the computer-readable storage medium further includes:

in response to the virtual object entering the inactivated target area, displaying activation prompt information in the control interface, where the in response to an activation behavior of a virtual object in the target area, obtaining current area state information of the target area, and adjusting a display parameter of the area mark control according to the current area state information includes:

after displaying the activation prompt information, in response to the activation behavior of the virtual object in the target area, obtaining the current area state information of the activated target area, adjusting the current area state information of the activated target area to a starting-to-leave state, and adjusting the display parameter of the area mark control according to the starting-to-leave state.

Here, the player is reminded to activate the target area through the activation prompt information, so that the player can activate the target area in time, and avoid delaying the evacuation of the virtual object in the virtual battle mission from the activated target area, thus helping to advance the game progress, and improving the efficiency of human-computer interaction.

In an optional embodiment, in the method of the instructions executed by the computer-readable storage medium, the obtaining current area state information of the target area, and adjusting a display parameter of the area mark control according to the current area state information further includes:

in response to the target area in the virtual scene being in a first area, obtaining the current area state information of the target area in the first area, adjusting the current area state information of the target area in the first area to a destroyed state, and adjusting the display parameter of the area mark control according to the destroyed state, where the first area is an area determined according to an area restriction an shrinkage rule for restricting the virtual object from executing the virtual battle mission.

Here, the range of activities of the virtual object in the virtual scene is limited, thus avoiding the problem of long time consumption caused by moving a long distance by the virtual object in the virtual scene, indirectly improving the efficiency of human-computer interaction, and speeding up the game progress.

In an optional embodiment, the method of the instructions executed by the computer-readable storage medium further includes:

after adjusting the current area state information of the target area in the first area to the destroyed state, regenerating the destroyed target area in a non-first area of the virtual scene, and sending a prompt message for prompting the virtual object that the target area is regenerated in the virtual scene.

Here, because a plurality of target areas can be used for the virtual objects to evacuate synchronously, the evacuation time of virtual objects in the current virtual battle mission is greatly reduced, thus improving the evacuation efficiency of the player, and speeding up the game progress.

In an optional embodiment, in the method of the instructions executed by the computer-readable storage medium, the obtaining current area state information of the target area, and adjusting a display parameter of the area mark control according to the current area state information further includes:

in response to a ready-to-leave behavior of the virtual object in the target area, obtaining the current area state information of the target area, adjusting the current area state information of the target area to a ready-to-leave state, and adjusting the display parameter of the area mark control according to the ready-to-leave state.

In an optional embodiment, in the method of the instructions executed by the computer-readable storage medium, the obtaining current area state information of the target area, and adjusting a display parameter of the area mark control according to the current area state information further includes:

in response to a vehicle in the virtual scene being in the target area, obtaining the current area state information of the target area where the vehicle is located, adjusting the current area state information of the target area where the vehicle is located to a waiting-to-leave state, and adjusting the display parameter of the area mark control according to the waiting-to-leave state, where the vehicle is configured for carrying the virtual object to assist the virtual object to evacuate from the target area.

Here, the current area state information may be indicated as the waiting-to-leave state by the vehicle existing in the target area, so that the player can easily grasp the current area state information, thus improving the proficiency of the player in evacuating from the current virtual battle mission, and indirectly improving the efficiency of human-computer interaction.

In an optional embodiment, the method of the instructions executed by the computer-readable storage medium further includes:

generating a vehicle carrying capacity control in the control interface after adjusting the current area state information of the target area where the vehicle is located to the waiting-to-leave state; and the in response to an evacuation behavior of the virtual object in the target area, determining that the virtual object has completed evacuation from the target area includes:

in response to the evacuation behavior of the virtual object in the target area, reducing a current carrying capacity of the vehicle, and adjusting the display parameter of the vehicle carrying capacity control according to the current carrying capacity of the vehicle to indicate the current carrying capacity of the vehicle; and in response to an evacuation condition that the virtual object satisfies in the target scene, determining that the virtual object has completed evacuation from the target area.

Here, according to the prompt information of the current carrying capacity, the player can judge whether to arrive at the target area to evacuate, which can reduce the moving time of the virtual object in the virtual scene and further improve the efficiency of human-computer interaction.

In an optional embodiment, the evacuation condition that the virtual object satisfies in the target scene includes at least one of that:

the number of virtual objects performing the evacuation behavior in the target area reaching a preset number;

the virtual object in the target area has an early evacuation behavior; and the current area state information of the target area is adjusted to the destroyed state.

Here, the above three evacuation conditions are to ensure that the player can evacuate from the target area as soon as possible after arriving at the target area, so that the game time of a single virtual battle mission will not be too long, thus reducing the waste of terminal processing resources and power resources.

In an optional embodiment, the method of the instructions executed by the computer-readable storage medium further includes:

after determining that the virtual object has completed the evacuation from the target area, adjusting the current area state information of the target area to a cool-down state, and adjusting the display parameter of the area mark control according to the cool-down state.

Here, the game balance is guaranteed, and the game performance is improved.

In an optional embodiment, the method of the instructions executed by the computer-readable storage medium further includes:

after adjusting the current area state information of the target area to the cool-down state, in response to a condition that a cool-down duration corresponding to the cool-down state ends, adjusting the current area state information to the waiting-to-leave state, and adjusting the display parameter of the area mark control according to the waiting-to-leave state.

Here, when the cool-down duration of the target area ends, and before the target area is destroyed, the virtual object can continue to evacuate by arriving at the target area, so as to achieve the effect of evacuating the current virtual battle mission as soon as possible, thus improving the evacuation efficiency of the player and speeding up the game progress.

In an optional embodiment, the method of the instructions executed by the computer-readable storage medium further includes:

when the current virtual battle mission meets a preset settlement condition, triggering and entering a settlement phase of the current virtual battle mission, where the preset settlement condition includes any one of that:

the virtual object in the current virtual battle mission has completed the evacuation from the target area; and all virtual objects that have not been eliminated in the current virtual battle mission have completed the evacuation from the target area.

Here, the integrity of the game is guaranteed.

Compared with the solution that the player searches for a fixed evacuation area by memory or exploration in the related technologies, according to the present disclosure, by displaying the position mark configured for indicating the orientation information of the target area in the virtual scene in the scene map and the current area state information of the target area corresponding to the display parameter of the adjusted area mark control in the control interface, the player may still grasp the current area state information of the target area without arriving at the target area for evacuation, and the player may determine the target area for evacuation more quickly by combining the position mark displayed in real time in the scene map and the current area state information of the target area displayed in the control interface, which may be helpful for the player to arrive at the target area for evacuation quickly and complete the evacuation in time, thus reducing the time consumption for the player to search for the target area for evacuation during the game, speeding up the game progress, improving the efficiency of human-computer interaction, making the game time of a single virtual battle mission not too long, and reducing the waste of terminal processing resources and power resources.

It can be clearly understood by those skilled in the art that for the convenience and conciseness of the description, the specific working processes of the above-described systems, apparatuses and units may refer to the corresponding processes in the aforementioned method embodiments, which will not be repeated here.

From the several embodiments provided by the present disclosure, it is understood that the disclosed system, apparatus and method may be implemented in other ways. The above-described apparatus embodiments are only schematic. For example, the division of the units is only a logical function division, and there may be another division mode in actual implementation. For example, a plurality of units or components may be combined or integrated into another system, or some features may be ignored or not performed. On the other hand, the shown or discussed mutual coupling or direct coupling or communication connection may be an indirect coupling or a communication connection through some communication interfaces, apparatuses or units, which may be in electrical, mechanical or in other forms.

The units described as separate parts may or may not be physically separated, and the parts displayed as units may or may not be physical units, that is, they may be located in one place or distributed over a plurality of network units. Some or all of the units may be selected according to the actual needs to achieve the objectives of the embodiments.

In addition, the functional units in various embodiments of the present disclosure may be integrated into one processing unit, or each unit may exist physically alone, or two or more units may be integrated into one unit.

If the functions are implemented in the form of functional units for software and sold or used as independent products, they may be stored in a nonvolatile computer-readable memory executable by a processor. Based on this understanding, the essential part of the technical solutions of the present disclosure or the part of the technical solutions that contributes to the prior art may be embodied in the form of a software product, which is stored in a memory and includes a number of instructions to make a computer device (which may be a personal computer, a server, or a network device, etc.) perform all or some of the steps of the methods described in various embodiments of the present disclosure. The aforementioned memory include: U disk, mobile hard disk, Read-Only Memory (ROM), Random Access Memory (RAM), magnetic disk or optical disk and other media that can store program codes.

Finally, it is to be noted that the above-mentioned embodiments are only specific examples of the present disclosure, which are intended to illustrate but not to limit the technical solutions of the present disclosure, and the scope of protection of the present disclosure is not limited to these embodiments. Although the present disclosure has been illustrated in detail with reference to the aforementioned embodiments, those ordinarily skilled in the art should understand that any skilled person familiar with the technical field may still modify or easily think of changes to the technical solutions described in the aforementioned embodiments within the technical scope disclosed in the present disclosure, or make equivalent substitution of some of the technical features. However, these modifications, changes or substitutions do not make the essence of the corresponding technical solutions deviate from the spirit and scope of the technical solutions of the embodiments of the present disclosure, and shall fall within the scope of protection of the present disclosure. Therefore, the scope of protection of the present disclosure shall be subject to the scope of protection of the claims.

What is claimed is:

1. An information processing method in a game, comprising:

in response to determining that a current virtual battle mission meets a preset condition, generating, by a terminal, a target area in a virtual scene, wherein a game interface is provided by the terminal, the game interface comprises a game screen and a control interface, the game screen comprises the virtual scene of the current virtual battle mission, and the control interface comprises a scene map control;

according to orientation information of the target area in the virtual scene, generating, by the terminal, a corresponding position mark at a position corresponding to the orientation information, in a scene map corresponding to the scene map control, and generating an area mark control corresponding to the target area in the control interface;

in response to an activation behavior of a virtual object in the target area, obtaining current area state information of the target area, and adjusting a display parameter of the area mark control according to the current area state information to indicate the current area state information; and in response to an evacuation behavior of the virtual object in the target area, determining that the virtual object has completed evacuation from the target area.

2. The method according to claim 1, further comprising: synchronizing the current area state information of the target area to all surviving virtual objects in the current virtual battle mission.

3. The method according to claim 1, further comprising: sending the current area state information indicated by the display parameter of adjusted area mark control to the game interface of at least one other virtual object, wherein the at least one other virtual object belongs to a same camp as the virtual object.

4. The method according to claim 3, wherein a player updates the current area state information of the target area in the game interface according to interaction with teammates for the target area.

5. The method according to claim 1, wherein the preset condition comprises at least one of:

a game progress of the current virtual battle mission reaching a preset time point;

the virtual object in the current virtual battle mission arriving at a designated position, wherein the designated position is a generation position at which a target area is generated in the virtual scene or a preset trigger position in the virtual scene for triggering generation of the target area;

a number of surviving virtual objects in the current virtual battle mission reaching a preset number; or a ratio of a first area in the virtual scene to the whole virtual scene reaching a preset numerical value, wherein the first area is an area for restricting the virtual object from executing the virtual battle mission, and the first area is determined according to an area restriction and shrinkage rule.

6. The method according to claim 5, wherein the preset number is determined according to a numerical value set by a game design, or is determined by intelligent analysis of a historical data in the virtual battle mission.

7. The method according to claim 1, wherein the current area state information comprises any one of:

a starting-to-leave state, a ready-to-leave state, a waiting-to-leave state, a cool-down state, or a destroyed state.

8. The method according to claim 7, wherein presentation forms of the ready-to-leave state and the waiting-to-leave state on the area mark control are replaced by a ready-to-leave state mark and a waiting-to-leave state mark, respectively, and the ready-to-leave state mark and the waiting-to-leave state mark are presented in form of progress bar, form of percentage, or form of time countdown.

9. The method according to claim 1, further comprising:

in response to the virtual object entering an inactivated target area, displaying activation prompt information in the control interface; and wherein obtaining the current area state information of the target area in response to the activation behavior of the virtual object in the target area and adjusting the display parameter of the area mark control according to the current area state information comprises:

obtaining the current area state information of the activated target area, adjusting the current area state information of the activated target area to a starting-to-leave state, and adjusting the display parameter of the area mark control according to the starting-to-leave state.

10. The method according to claim 1, wherein obtaining the current area state information of the target area and adjusting the display parameter of the area mark control according to the current area state information further comprises:

in response to the target area in the virtual scene being in a first area, obtaining the current area state information of the target area in the first area, adjusting the current area state information of the target area in the first area to a destroyed state, and adjusting the display parameter of the area mark control according to the destroyed state, wherein the first area is an area for restricting the virtual object from executing the virtual battle mission, which and the first area is determined according to an area restriction and shrinkage rule.

11. The method according to claim 10, further comprising:

regenerating a destroyed target area in a non-first area of the virtual scene, and sending a prompt message for prompting the virtual object that the target area is regenerated in the virtual scene.

12. The method according to claim 1, wherein obtaining the current area state information of the target area and adjusting the display parameter of the area mark control according to the current area state information further comprises:

in response to a ready-to-leave behavior of the virtual object in the target area, obtaining the current area state information of the target area, adjusting the current area state information of the target area to a ready-to-leave state, and adjusting the display parameter of the area mark control according to the ready-to-leave state.

13. The method according to claim 12, wherein obtaining the current area state information of the target area and adjusting the display parameter of the area mark control according to the current area state information further comprises:

in response to a vehicle in the virtual scene being in the target area, obtaining the current area state information of the target area where the vehicle is located, adjusting the current area state information of the target area where the vehicle is located to a waiting-to-leave state, and adjusting the display parameter of the area mark control according to the waiting-to-leave state, wherein the vehicle is configured for carrying the virtual object to assist the virtual object to evacuate from the target area.

14. The method according to claim 13, further comprising:

generating a vehicle carrying capacity control in the control interface after the current area state information of the target area where the vehicle is located is adjusted to the waiting-to-leave state; and wherein determining that the virtual object has completed evacuation from the target area in response to the evacuation behavior of the virtual object in the target area comprises:

in response to the evacuation behavior of the virtual object in the target area, reducing a current carrying capacity of the vehicle, and adjusting a display parameter of the vehicle carrying capacity control according to the current carrying capacity of the vehicle to indicate the current carrying capacity of the vehicle; and in response to an evacuation condition that the virtual object satisfies in the target scene, determining that the virtual object has completed the evacuation from the target area.

15. The method according to claim 14, wherein the evacuation condition that the virtual object satisfies in the target scene comprises at least one of:

number of virtual objects performing the evacuation behavior in the target area reaching a preset number;

an early evacuation behavior done by the virtual object in the target area; or the current area state information of the target area adjusted to the destroyed state.

16. The method according to claim 14, further comprising:

adjusting the current area state information of the target area to a cool-down state, and adjusting the display parameter of the area mark control according to the cool-down state.

17. The method according to claim 16, further comprising:

in response to a condition that a cool-down duration corresponding to the cool-down state ends, adjusting the current area state information to the waiting-to-leave state, and adjusting the display parameter of the area mark control according to the waiting-to-leave state.

18. The method according to claim 1, further comprising:

triggering and entering a settlement phase of the current virtual battle mission, in response to determining that the current virtual battle mission satisfies a preset settlement condition, wherein the preset settlement condition comprises any one of:

the virtual object in the current virtual battle mission completing the evacuation from the target area; or all the virtual objects that have not been eliminated in the current virtual battle mission completing the evacuation from the target area.

19. An electronic device, comprising a processor, a memory and a bus, wherein the memory stores machine-readable instructions executable by the processor, wherein when the electronic device is running, the processor communicates with the memory through the bus, and the processor executes the machine-readable instructions to perform steps of an information processing method, with the information processing method comprising:

in response to determining that a current virtual battle mission meets a preset condition, generating a target area in a virtual scene, wherein a game interface is provided by the electronic device, the game interface comprises a game screen and a control interface, the game screen comprises the virtual scene of the current virtual battle mission, and the control interface comprises a scene map control;

according to orientation information of the target area in the virtual scene, generating a corresponding position mark at a position corresponding to the orientation information, in a scene map corresponding to the scene map control, and generating an area mark control corresponding to the target area in the control interface;

in response to an activation behavior of a virtual object in the target area, obtaining current area state information of the target area, and adjusting a display parameter of the area mark control according to the current area state information to indicate the current area state information; and in response to an evacuation behavior of the virtual object in the target area, determining that the virtual object has completed evacuation from the target area.

20. A non-transient transitory computer-readable storage medium, storing a computer program thereon, wherein the computer program, when run by a processor, executes steps of an information processing method, with the information processing method comprising:

in response to determining that a current virtual battle mission meets a preset condition, generating a target area in a virtual scene, wherein a game interface is provided by a terminal, the game interface comprises a game screen and a control interface, the game screen comprises the virtual scene of the current virtual battle mission, and the control interface comprises a scene map control;

according to orientation information of the target area in the virtual scene, generating a corresponding position mark at a position corresponding to the orientation information, in a scene map corresponding to the scene map control, and generating an area mark control corresponding to the target area in the control interface;

in response to an activation behavior of a virtual object in the target area, obtaining current area state information of the target area, and adjusting a display parameter of the area mark control according to the current area state information to indicate the current area state information; and in response to an evacuation behavior of the virtual object in the target area, determining that the virtual object has completed evacuation from the target area.

* * * * *